United States Patent

Goetz

Patent Number: 6,041,157
Date of Patent: Mar. 21, 2000

[54] ENVIRONMENTALLY SENSITIVE COMPOSITIONS OF MATTER BASED ON 3H-FLUOREN-3-YLIDENES AND PROCESS FOR MAKING SAME

[76] Inventor: Frederick James Goetz, 2320 Lighthouse La., Wilmington, Del. 19810

[21] Appl. No.: 08/980,446

[22] Filed: Nov. 28, 1997

Related U.S. Application Data

[60] Provisional application No. 60/032,280, Dec. 3, 1996.
[51] Int. Cl.[7] .................. G02B 6/00; G02B 5/23
[52] U.S. Cl. ................. 385/141; 385/12; 385/14; 385/147; 252/586
[58] Field of Search .................... 385/141, 143, 385/145, 14, 12; 252/586

[56] References Cited

U.S. PATENT DOCUMENTS

| | | | |
|---|---|---|---|
| 4,316,043 | 2/1982 | Cragoe et al. | 544/155 |
| 5,585,042 | 12/1996 | Knowles | 252/586 |
| 5,645,767 | 7/1997 | Van Gemert | 252/586 |
| 5,691,442 | 11/1997 | Unroe et al. | 528/125 |
| 5,698,141 | 12/1997 | Kumar | 252/586 |

*Primary Examiner*—Brian Healy

[57] ABSTRACT

The present invention relates to compounds and derived materials based on compositions of matter consisting of appropriately substituted 3H-fluoren-3-ylidenes shown in figure A wherein the large dots (●) represent specific substituents define in the invention.

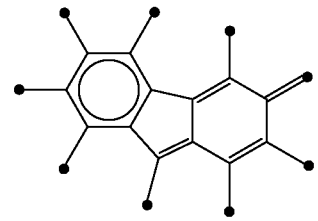

A

These compounds and derived materials are able to undergo substantial changes in their optical properties in response to environmental changes. Such compounds and materials, for example, undergo substantial changes in their optical emission and absorption as well as refraction in different environments. In addition, by virtue of their ability to undergo permanent changes in refraction on exposure to certain predetermined wavelengths of radiation, the compounds and materials are photoprocessable by conventional techniques for the fabrication of optical devices and circuits, for computer, telecommunications, entertainment, defense, and sensor applications. A major subclass of the subject compounds and materials possess strong luminescence, optical, absorption, and refraction in the near infrared region of the electromagnetic spectrum which permits ready integration into electronic, electrooptic, and optic solid state components, devices, and systems.

2 Claims, No Drawings

ENVIRONMENTALLY SENSITIVE COMPOSITIONS OF MATTER BASED ON 3H-FLUOREN-3-YLIDENES AND PROCESS FOR MAKING SAME

CROSS REFERENCES TO RELATED APPLICATIONS

This non-provisional patent application is concordant with the Provisional application NO. 60/032,280 filed on Dec. 3, 1996, pending entitled:

BACKGROUND OF THE INVENTION

The present invention relates to compounds and derived materials which are capable of undergoing substantial changes in their optical properties in response to environmental changes, namely, compounds and derived materials which, for example, undergo substantial changes in their optical emission, absorption, and refraction in different environments. In addition, the subject compounds and materials conveniently may be fabricated into optical device and circuit configurations by conventional photo processing techniques. Such devices and circuits are highly useful, for example, in a variety of applications, including computer, telecommunication, entertainment, defense, and sensor applications.

An example of such devices include biomedical sensors, such as, a non-invasive glucose analytical system and an extremely high frequency, that is, EHF=3 GHz to 3 THz, electrooptical modulator. The former biomedical sensor is sensitive in its optical emission with respect to the levels of glucose in the surrounding environment. The latter electrooptical modulator is sensitive in its index of refraction with respect to the electric field strength and direction in the surrounding medium.

A major subclass of the subject compounds and materials are capable of optical emission, absorption, and strong refraction in that region of the long wavelength visible and short wavelength near infrared spectrum from 800 nm to 1200 nm wherein human blood and tissue possess minimal optical absorption. Therefore, such compounds and materials may be used with implants for non-invasively determining vital medical information, such as blood and tissue levels of glucose, electrolytes, heavy metals, carbon dioxide, oxygen, antibodies, acidity, and/or alkalinity, and the like. In addition, within this wavelength range, there now exists a very broad range of compact and low cost optical transmitters and receivers which permit complete diagnostic systems to be mass produced at low cost and conveniently carried by the consumer As an example of the timeliness and utility of this invention, we illustrate its advantages over a state-of-the-art glucose analytical system. In a recent book cited below, a glucose analytical system was proposed using the environmentally sensitive Texas Red material. This system, due to limitations imposed by the optical absorption of Texas Red in the wavelength range 500 nm to 600 nm, utilized an optical transmitter consisting of a green helium neon gas laser with a 543 nm emission line. This laser, which is very expensive, large in size and requires a large power source, precluded the application of this system as a low cost, portable, user-friendly device. In addition, high absorption of the 543 nm line by human skin, hemoglobin, and oxyhemoglobin encourages the discovery of environmental sensors which absorb light from optical transmitters which emit in the wavelength range of 800 nm to 1200 nm; a broad range of subject compounds and materials of the present invention absorb in that wavelength range.

Currently, in the wavelength range of 800 nm to 1200 nm, a number of compact, low cost LED's and laser diode optical transmitters and a number of PIN and photodiode optical detectors now exist. Therefore, compositions of matter which are active in this range fill a current vital need, as they may be used as environmental sensors in conjunction such transmitters and detectors.

There exist current, state-of-the-art environmental sensor compounds for biomedical applications for implant use; these compounds are designed to possess optimum absorption and emission properties in the long wavelength visible or short wavelength region of 650 nm to 1200 nm to function efficiently in the presence of human skin, hemoglobin, and oxyhemoglobin which together have low absorption above 700 nm and minimal absorption between 1000 and 1200 nm. Examples of such modern materials are indocyanines which absorb near 700 nm and emit near 770 nm and naphthocyanines which absorb near 772 nm and emit near 780 nm. However, the indocyanines, apparently due to the presence of multiple single bonds within the conjugated center of the molecule, are inefficient emitters due to rotation around these bounds which lead to quenching of luminescence. The naphthocyanines are highly insoluble materials and are therefore difficult to incorporate into devices and systems. In addition, the naphthocyanines are highly stable to light and therefore not readily photoprocessable. Both the indocyanines and naphthocyanines fall short in both absorption and emission of the long wavelength range of 800 to 1200 nm preferred for biosensors.

Preferred compositions of matter should involve chromophores which embody the conjugated portion in a totally rigid, planar structure in which the single bonds cannot rotate about their axis in a manner to interrupt conjugation. Therefore, such compounds and derived materials are likely to be more efficiently luminescent than their cyanine or merocyanine counterparts, such as the indocyanines described above, which contain deleterious, rotatable single bounds, the rotation of which can break the conjugation and thereby cause emission to occur at low efficiency. In addition, preferred compounds and materials should absorb and emit in the highly preferred 700 to 1200 nm wavelength range.

To be practical and broadly applicable such compounds and materials should be producible by highly conventional, modular chemistry which during the appropriate processing steps can be rendered in highly soluble or liquid form; thus, they may be readily incorporated into devices or systems. In this regard, such compounds and materials have advantages over the naphthocyanines.

Luminescent biosensors and other luminescent environmentally sensitive compounds, materials, devices, and systems are discussed at length in a recent book on this topic published in 1994 by Plenum Press of New York and London entitle: "Topics in Fluorescence Spectroscopy, Volume 4, Probe Design and Chemical Sensing."

Besides biomedical applications, the present invention finds utility with regard to computer, telecommunications, entertainment, defense, and sensor systems. With an ever-increasing demand for faster performing systems in these areas, current interest has focused on materials from which such devices and systems in the extremely high frequency (EHF=3 GHz to 3 THz) range can be cheaply and efficiently fabricated.

Examples of the most simple EHF devices or components are electrooptical modulators or switches which are based on materials which undergo substantial changes in their refractive indices in the presence of applied electric fields. Currently, such EHF products are produced from inorganic crystals, such as lithium niobate or inorganic semiconductor materials, such as gallium arsenide. Devices, components, and systems for these materials are not producible at high volume, high production rate and low cost. In addition, these products are only available in quantity in the low end of the EHF ranges less that 20 GHz.

In contrast to the inorganic materials, organic polymeric materials appear to have great potential for high volume, high rate, and low cost production. Such materials may be mass produced by simple polymer coating technology in a manner resembling printing. Thus, there is a current interest in organic materials capable of manipulation of light in optical and fiber optic devices and systems. For example, such materials are the subject of an article published in the March 1996 issue of *Chemical & Engineering News* entitled: "Devices Based on Electro-optic Polymers Begin to Enter the Marketplace."

However, the molecular structure of the materials from which these organic polymeric EHF products are currently being produced are far from optimal. The solvatochromic spectral shifts of the compounds, azobenzene and stilbenes, responsible for the electrooptical activity of these materials are small, indicating that the electrooptical performance of derived devices and systems is likely to be small. In addition, some of the end-product materials are fabricated by an isocyanate cross-linking process which produces materials which are moisture sensitive and therefore degrade in performance over time.

Compounds and materials which possess much larger solvatochromic spectral shifts that state-of-the-art azobenzene and stilbene analogs and are therefore likely to be more electroactive. In addition to being amenable to isocyanate processing, compounds and materials that are amenable to processing techniques which do not possess moisture sensitivity problems are preferred.

Generally, materials which exhibit strong electric moments and electrooptical coefficients such as $\mu, \alpha, \beta,$ and $\gamma$ for the compounds and $X_0$, $X_1$, $X_2$, and $X_3$ for the materials are preferred. It is well known in the state of the art that materials with high $X_2$ are capable of producing modulation of light at high frequencies by application of appropriately modulated electric fields and that materials with high $X_3$ are capable of producing similar modulation with appropriately modulated photonic fields. Also preferred are materials that exhibit this useful property in the near infrared range from 700 nm to 2000 nm, wherein a number of low cost coherent light sources and sensitive electronic detectors are readily available. In addition, to greatly facilitate the incorporation of these compounds and materials into environmental sensors and optical devices and systems, compounds and materials which are generally amenable to currently available photoprocessing technologies utilizing mass fabrication of these products are preferred. Therefore, the present invention relates to compounds and derived materials which, in addition to their environmentally sensitive luminescence, are able to convey and manipulate light in optical and fiber optic devices and systems as are required for extremely high frequency (EHF=3 GHz to 3 THz) computer, telecommunications, entertainment, defense and sensor applications.

SUMMARY OF THE INVENTION

The present invention relates to a specific class of compounds and materials embodying the 3H-fluoren-3-ylidene frontier molecular orbital depicted as figure A below wherein the large dots (●) represent substituents, the nature of which is defined in the preferred embodiment and determined by the specific area of application.

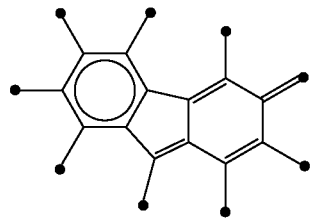

A

This frontier molecular orbital is the basis of the unique luminescent and electrooptical properties of the derived compounds and material described herein. These properties include substantial environmental sensitivity of the optical and electrooptical properties of the said compounds and materials. In addition, these compounds and materials readily lend themselves to incorporation into useful devices and circuits by virtue of their amenability to conventional photoprocessing techniques currently employed for this purpose. Embodiments are detailed below and further illustrated with FIGS. 1 through 10 below, which include concatenated analogues of appropriately substituted 3H-fluoren-3-ylidene compounds, chemical compounds used as intermediates to make certain 3H-fluoren-3-ylidene compounds, and a processes of making certain compounds and derived materials. Examples of processes for the fabrication of practical extremely high frequency (EHF in the range of 3 GHz to 3 THz) devices for computer, telecommunications, entertainment, defense and sensor applications are given.

DETAILED DESCRIPTION OF THE INVENTION

The Preferred Embodiment of the Invention: General Introduction

The preferred embodiment of the present invention includes a specific class of compounds and materials embodying the 3H-fluoren-3-ylidene molecular orbital depicted as figure A below wherein the large dots (●) represent specific substituents, the nature of which is defined in detail below.

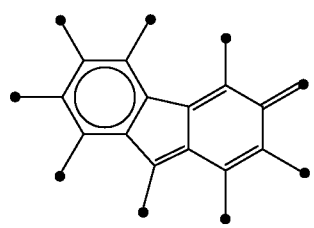

A

This frontier molecular orbital is the basis of the unique luminescent and electrooptical properties of the derived compounds and materials described in detail below. These properties include substantial environmental sensitivity of the optical and electrooptical properties of these compounds and materials. In addition, these compounds and materials readily lend themselves to incorporation into useful devices and circuits by virtue of their amenability to conventional photoprocessing techniques currently employed for this purpose and are exemplified in detail below. Processes for making these compounds and derived materials, including several types of polymeric derivatives, and several kinds of derived devices are described in detail below. Therefore, within the preferred embodiment of this invention, the following are described in detail: detailed description of compounds; specific synthetic processes for compounds; specific processes for materials including polymers; specific sensor devices and fabrication processes; and, specific optoelectronic devices and fabrication processes. Most of the processes for elaborating functionality in compounds and materials, excepting only processes for constructing the 3H-fluoren-3-ylidene entity, and all processes for devices are well known to those skilled in the art.

The Preferred Embodiment of the Invention:
Detailed Description of Compounds

One aspect of this invention relates to a luminescent, polarizable, and highly refractive appropriately substituted 3H-fluoren-3-ylidene compound capable of undergoing a rapidly reversible change in luminescence, light absorption and refraction due to environmental changes. Such changes include the presence of electromagnetic radiation, a local electric field, or a change in the immediate molecular environment due to the reorientation of local molecules. In addition these 3H-fluoren-3-ylidene compounds undergo a permanent change in luminescence, light absorption, and refraction on exposure to predetermined bands of optical radiation and are typified by structure 1:

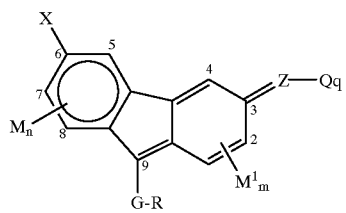

1

To promote highly desirable long wavelength luminescence, and light absorption, polarizability, and high refraction, the subject 3H-fluoren-3-ylidenes are preferable substituted in the 3 and/or 6 positions with electron-donating and/or electron-accepting groups.

Such substitution, which is essential to the preferred embodiment of this invention, is necessary to promote chemical stability of this antiaromatic system and to produce high sensitivity to changes in the electrical polarity of the surrounding environment as induced by measurable changes in luminescence, light absorption and refraction; by creating string contributions to the electronic structure of the subject 3H-fluoren-3-ylides by materially equivalent electronically polarized canonical structures such as 1D and 1A.

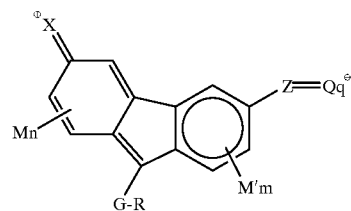

1D

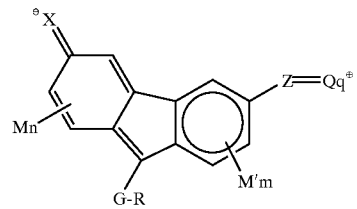

1A

Therefore when the 6-substituent X- in structure 1 is an electron-accepting group A-, the subject compounds are depicted in structure 1A-a or resonance canonical structure 1A-b.

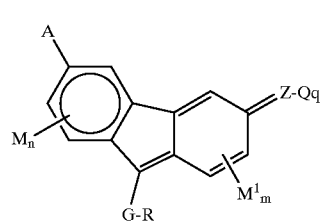

1A-a

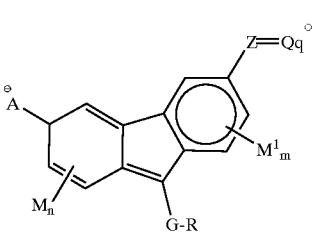

1A-b

Or, when the 6-substituent X- in structure 1 is an electron-donating group D-, the subject compounds are as depicted in structure 1D-a or resonance canonical structure 1D-b.

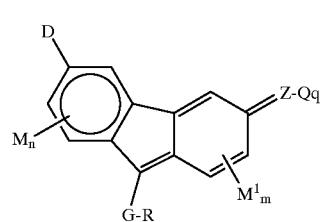

1D-a

-continued

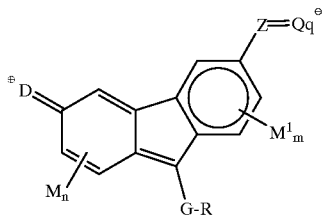

1D-b

Additionally, electron-accepting capability is introduced into the 3-position by substitution of one or more Q groups in structure 1D-a by an electron-accepting group A. Therefore illustrating the case where one Q group is substituted by an A group, the subject compounds are depicted in structure 2A-a or resonance canonical structure 2A-b.

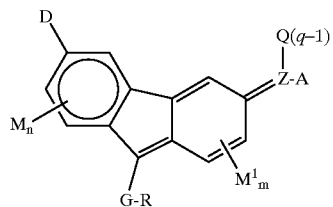

2A-a

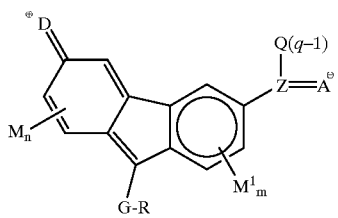

2A-b

Similarly, electron-donating capability is introduced into the 3-position by substitution of one or more Q groups in structure 1A-a by an electron-donating group D. Therefore illustrating the case where one Q group is substituted by an D group, the subject compounds are as depicted in structure 2D-a or resonance canonical structure 2D-b.

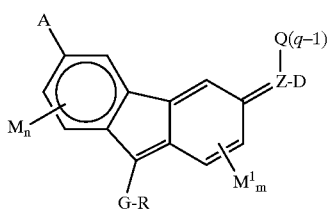

2D-a

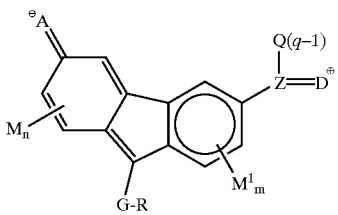

2D-b wherein:

X- may be either D- or A-

D- may be an electron-donating group J

D- comprises $D^1$=Z in structures 1D-a, 2A-a, or 2D-a, corresponding to ⊕ $D^1$-Z= resonance canonical structures 1D-b, 2A-b, 2D-b, or $D^2$=C- in structures 1D-a, 2A-a, or 2D-a, corresponding to ⊕ $D^2$-C= in resonance canonical structures 1D-b, 2A-b, or 2D-b.

where $D^1$ and $D^2$ is electron-donating substituted or unsubstituted unsaturated heterocyclic organic ring system having a members in the ring system, one to (a-1) members being at least one electron donating heteroatom having one or two lone electron pairs, the $D^1$ and $D^2$ substituents being bonded to a carbon or to a heteroatom of the ring system and being J or L;

Z is a trivalent atom having one lone electron pair orbital or a substituted or unsubstituted tetravalent atom, the substituents for the tetravalent atom being J, L, $R^1$, $R^2$, G-R, Q, T, Y, or $R^*$.

$Z^1$ and $Z^2$ each independently have the same definition as Z;

$D^2$=C— in structures 1D-a, 2A-a, or 2D-a, corresponding to ⊕$D^2$-C= in resonance canonical structures 1D-b, 2A-b, or 2D-b, is a substituted or unsubstituted aromatic carbocyclic or substituted aromatic heterocyclic ring system, where C of $D^2$=C- or ⊕$D^2$-C= is a member of the ring system having b members and c J substituents, where c is zero to (b-1) and each J substituent is the same or different, $D^2$=C- or ⊕$D^2$-C= further having from zero to (b−c) additional substituents, the additional substituents being $R^1$, $R^2$, G-$R^3$, G-Q, G-T, G-Y, G-$R^*$, Q, T, Y, or $R^*$;

A- is an electron withdrawing L group.

L is an electron-withdrawing group such as:

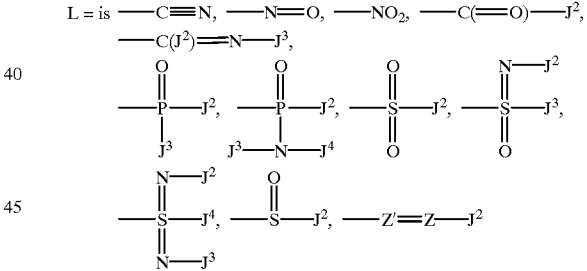

$L^1$ independently has the same definition as L;

where J is an electron-donating group —R, $R^1$, $R^2$, $R^3$, $(CH_2)_n$—$R^1$, —S—$R^1$, —O—$R^1$, —N($R^1$)($R^2$), -G-$R^1$, —$(CH_2)_n$-G-$R^1$, —S—G-$R^1$, —O—G-$R^1$, —N(-G-$R^1$)(-G-$R^2$), —O—O—$R^1$, —O—O-G-$R^1$, —S—S—$R^1$, —S—S—G-$R^1$; $J^1$ is —$(CH_2)_n$—$R^1$, —S—$R^1$, —O—$R^1$ or —N($R^1$)($R^2$); $J^2$, $J^3$, and $J^4$ each independently have the same definition $L^2$ is =C(A_1)(A_2); $L^3$ is —C(R)=C(A_1)(A_2); and $L^4$ is —C(R)=C(A_1)(A_2); where -continued L² is a possible representation of 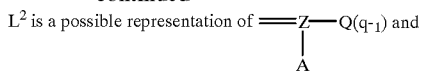

L³ and L⁴ are typical L groups;

where $A^1$ and $A^2$ are independently each an electron-withdrawing L group or $A^1$ and $A^2$ together may form a substituted or unsubstituted ring system when the L group contains a R substituent, where R and the substituents for the $A^1$-$A^2$ ring system are independently J, L, $R^1$, $R^2$, G-R, Q, T, Y, or R*;

G is a diradical comprising substituted or unsubstituted —(CH=CH)$_n$—, where n is an integer from 1 to 10, substituted or unsubstituted —(CH$_2$)$_w$—, where w is an integer from 1 to 22, a substituted or unsubstituted aromatic ring system of 6 to 16 carbons or a substituted or unsubstituted aromatic heterocyclic ring system of 5 to 14 members in the ring system, the members being carbon and 1 to (g−1) heteroatoms, where g is the number of members in the heterocyclic ring system, the heteroatoms being one or more of N, P, O, S, Se, or Te, the G substituents being $J^1$ or $L^1$ with the proviso that the maximum number of G substituents is 6;

$R^1$ and $R^2$ are independently H, F, Cl, Br, I, Q, T,Y alkyl of 1 to 22 carbons, cycloalkyl of 3 to 22 carbons, a substituted or unsubstituted aromatic ring system of 6 to 16 carbons or a substituted or unsubstituted aromatic heterocyclic ring system of 5 to 14 members in the ring system, the members being carbon atoms and 1 to (h−1) heteroatoms, where h is the number of members in the heterocyclic ring system, the heteroatoms being one or more of N, P, O, S, Se, or Te, the $R^1$ or $R^2$ substituents being $J^1$ or $L^1$ with the proviso that the maximum number of R, $R^1$ or $R^2$ substituents is 7;

R3 is H,F,Cl, Br, I, Q, T, Y alkyl of 1 to 22 carbons or cycloalkyl of 3 to 22 carbons; and R* is a chemically reactive group. Examples of such chemically reactive groups are reactive halides, such as, carbonyl halides of 1 to 2 carbons; sulfonyl halides of 0 to 20 carbons; sulfinyl halides of 0 to 20 carbons; phosphoryl halides of 0 to 20 carbons; imidyl halides of 1 to 21 carbons; alkyl halides of 1 to 31 carbons; α-haloesters of 1 to 31 carbons; α-haloketones of 1 to 31 carbons; aryl halides of 6 to 32 carbons; heterocyclyl halides of 1 to 22 carbons and 1 to 21 heteroatoms one or more of which may be N, P, O, S, Se, and Te; cycloalkyl halides of 2 to 32 carbons. In addition, such reactive R* groups may be reactive unsaturated groups, such as, isocyanates; isothocyanates; ketenes; olefines; acetylenes, allenes; ketones; α,β-diones; α,β,γ-triones; imines; α,β-diimines; azides; carbodimides; unsaturated ketones, esters, sulfonones, sulfonamides, and sulfonates; and carbon double bonded to heteroatoms, such as, P, S, Se, and Te. Additionally, R* group may be groups which react with the sited halides and unsaturated groups including alcohols of 1 to 21 carbons; carboxylic acids of 1 to 21 carbons; sulfonic acids of 0 to 20 carbons; carboxamides of 1 to 21 carbons; sulfonamides of 0 to 20 carbons; amines of 1 to 30 carbons; aryl groups of 6 to 36 carbons; heteroaryl groups of 1 to 22 carbons and 1 to 21 heteroatoms one or more of which may be N, P, O, S, Se, or Te; mercaptans of 0 to 21 carbons; phosphates; alkali metals, such as, Li, Na, K, Rb, and Cs; alkaline earth metals, such as, Be, Mg, Ca, Sr, and Ba; transition metals; and metals of the B-group of the periodic table. R* groups are such chemically reactive groups which are capable of covalently attaching the subject 3H-fluoren-3-ylidenes to another chemically reactive moiety or matrix.

Q is a A,D, electron lone pair, or T group;

T is a polymerizable group, the polymerizable group being a, b, unsaturated carbonyl of 4 to 26 carbons, vinyl ether of 3 to 25 carbons, carboxylic acid of 2 to 23 carbons, ester of 3 to 45 carbons, alcohol of 1 to 22 carbons, isocyanate of 1 to 22 carbons, isothiocyanate of 1 to 22 carbons, amine of 1 to 44 carbons, 1-substituted or 1,1-substituted alkylene of 2 to 44 carbons, or a polymerizable group of 1 to 44 carbons containing a nucleophilically replaceable group of zero to 22 carbons, and other polymerizable groups known to those skilled in the art. The T substituents being G-Y, G-Q, and G-R*.

Y is a polymerization-initiating group; the polymerization-initiating group being an α,β-dione of 2 to 22 carbons; an azoalkane of 1 to 21 carbons; an alkylperoxide of 1 to 21 carbons, a hydroperoxide of 0 to 20 carbons; a peroxide ester of 1 to 21 carbons; a persulfonate of 0 to 20 carbons; an α,β-disulfone of 0 to 20 carbons; an ester of 1 to 21 carbons; an ether of 1 to 21 carbons; an alcohol of 1 to 21 carbons; an amine of 1 to 41 carbons; a sulfonic acid of 0 to 20 carbons; a carboxamide of 1 to 21 carbons; an acid methyl of structure —CHA$^1$A$^2$ of 1 to 31 carbons; a substituted cyclopropane of 3 to 23 carbons; a substituted cyclobutane of 4 to 24 carbons; a substituted iodonium group of 1 to 31 carbons; a substituted sulfonium group of 2 to 42 carbons; and other polymerization initiating group known to those skilled in the art: Substituents on the polymerization-initiating group being J, L, $R^1$, $R^2$, G-R, G-Q, G-T, G-R*, Q, T, or R*;

M and $M^1$ are independently substituents of type J, L, $R^1$, $R^2$, Q, T, Y, G-R, G-Q, G-T, G-R*, and G-Y where the number of M substituents is n wherein n is in the range 0 to 3 and where the number of M's substituents is m where m is in the range 0 to 3;

M may also be a carbocyclic or heterocylic ring system fused to positions 7 to 8 of structure 1 wherein the carbocyclic ring system is of 6 to 46 carbons and wherein the heterocyclic ring system is of 2 to 32 carbons and which may include up to 20 heteroatoms including one or more of: N, P, O, N, S, Se, Te, or I; $M^1$ may also be independently a carbocyclic or heterocyclic ring system fused to the positions 1 to 2 of structure 1 wherein the carbocyclic ring system is of 6 to 46 carbons and wherein the heterocyclic ring system is of 2 to 32 carbons and which may include up to 20 heteroatoms including one or more of: N, P, O, N, S, Se, Te, or I;

M and/or $M^1$ may additionally and independently be -G- groups which connect directly proximal substituents and/or positions of structure 1. Such connections include those between: the X substituent at position 6 and either or both positions 5 and 7 and/or substituents upon these positions; the Z and/or Q substituents at position 3 and with or both positions 2 and 4 and/or substituents upon these positions; positions 4 and 5 and/or substituents upon these positions; positions 1 and 2 and/or substituents upon these positions; positions 1 and 7 and/or substituents upon these positions; positions 6 and 7 and/or substituents upon these positions; and positions 5 and 6 and/or positions. The connecting -G- groups may be then independently substituted with substituents of type J, L, R', $R^2$, Q, R*, T, Y, $G^1$-R, $G^1$-Q, $G^1$-T, $G^1$-Y and G1-R*, where $G^1$ has the same definition as G.

Another aspect of this invention is concatenated analogues of 1; namely 3, 4, and 5; wherein polymeric strings of 1 sites are present in the following structures:

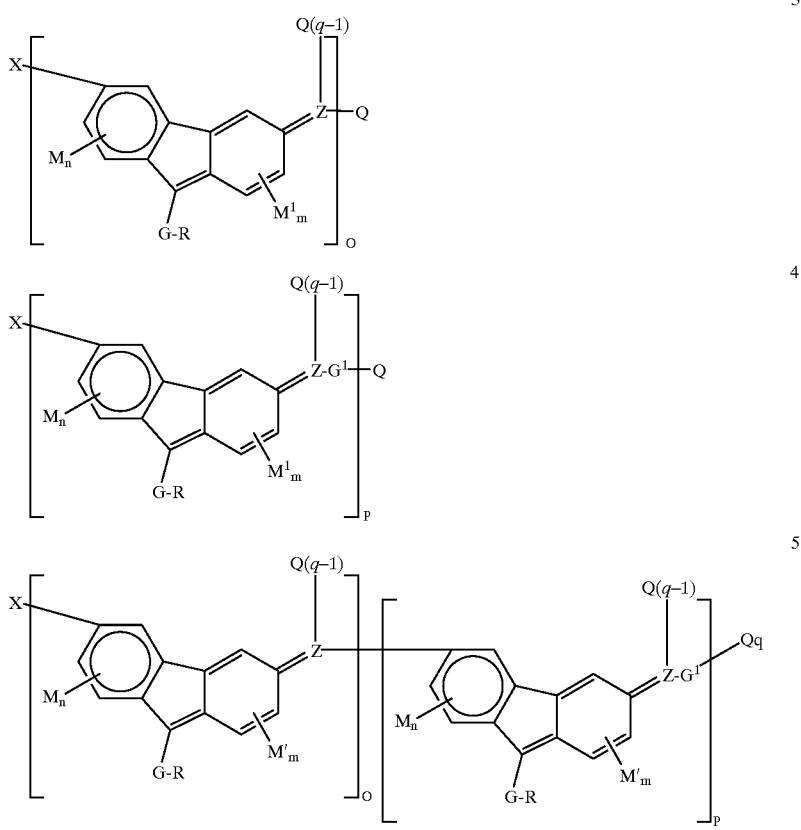

wherein:
 the substituents are defined previously or subsequently herein and O and P are in the range 1 to one million.

Another aspect of this invention relates to chemical compounds used as intermediates to make certain of the 3H-fluoren-3-ylidene compounds of the present invention. The intermediate compound having structure 7.

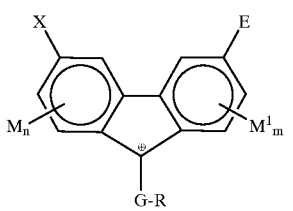

wherein:
 X, G-R, Mn and M'm are as defined above; and,
wherein:
 X may also be an E group and wherein the E group is a nucleophilically replacable group selected from the class of F, Cl, Br, I, —OL, —SL-, SeL, —TeL, —NRL, —NLL', —PRL, and —PLL' and other nucleophilically selected from the class of —OH, —SH, —SeH, —TeH, —NH$_2$, —NHR, —NHL, —PH$_2$, —PHR, PHL, —CHRR$^1$, —CHRL, —CHLL$^1$, —SiHRR', —SiHRL, —SIHLL, -ZHQq, or the intermediate nucleophiles 9 or 10.

Key intermediate 9H-fluoren-9-ium compounds 7 are synthetically derived from the intermediate 9H-fluoren-9-ol compounds 8 which, in turn, are derived from the intermediate 9H-fluoren-9-one compounds 6. These synthetic processes being described in detail below.

9H-Fluoren-9-ol compounds 8:

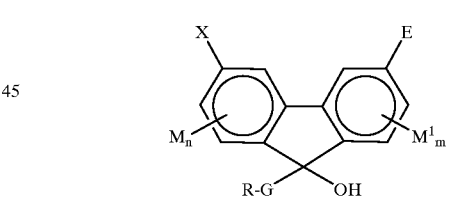

wherein:
 X, E, G-R, Mn and M'm are as previously or subsequently defined herein, and;

9H-Fluoren-9-one compounds 6:

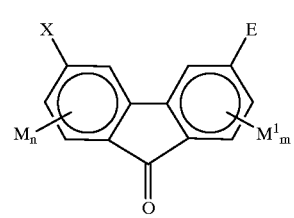

wherein:

X, E, Mn and M'm are as previously or subsequently defined above.

Another aspect of this invention relates to a novel process of making the novel compounds wherein a nucleophile of structure $HE^1\Phi$ is permitted to react with novel 9H-Fluoren-9-ium compounds 7 which process results in replacement of the E group by the $E^1$ groups, described above.

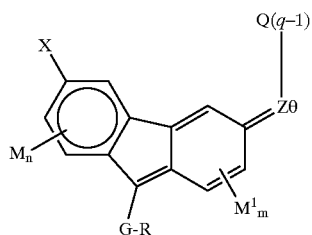

9

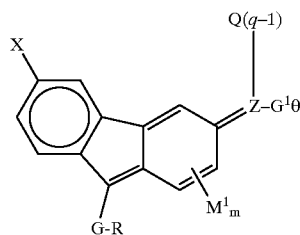

10

Further, another aspect of this invention relates to compositions, described in detail below, capable of undergoing a reversible change in its optical properties in response to environmental changes. Such compositions, for example, undergo substantial changes in their optical emission or luminescence and optical absorption as well as refraction in different environments. In addition, these compositions are capable of undergoing a permanent change in refraction due to exposure to predetermined bands of optical radiation.

These compositions consist of the subject 3H-fluoren-3-ylidenes as such or within a preferred matrix. The matrix may consist of a fluid or solid solvent, crystal, biological material, liquid crystal or polymer. The polymers, described in detail below, containing the 3H-fluoren-3-ylidene may be a distinct substance or a copolymer or homopolymer of a 3H-fluoren-3-ylidene which has one or more polymerizable substituents. In addition, the composition may consist of the subject 3H-fluoren-3-ylidene covalently bound to the matrix by the reaction of a 3H-fluoren-3-ylidene embodying a chemically reactive substituent with the matrix. Such reactions, described in detail below, may be induced by the application of heat, electric field, or electromagnetic radiation and/or the presence or absence of appropriate catalysts. For certain applications the 3H-fluoren-3-ylidene sites may be directionally orientated by the application of radiation, electric and/or magnetic fields during the formation of the end-product composition.

By virtue of the novel ability of the subject 3H-fluoren-3-ylidenes to undergo irreversible photolysis on absorption of certain predetermined wavelengths of radiation the distribution of the optically active 3H-fluoren-3-ylidene sites may be localized within certain desirable regions of the end-product matrix composition by standard photoprocessing techniques as described in detail below.

The Preferred Embodiment of the Invention: Detailed Description of Synthetic Processes for Compounds While the patent literature is replete with a very broad range of synthetic processes for 9H-fluorenes and 9H-fluoren-9-ones, no such processes are represented for 3H-fluorenes much less substituted analogues such as 3H-fluoren-3-ylidenes 1. Therefore this invention includes a novel synthetic process for the generation of compounds 1.

Key to this process is the novel and very broadly applicable fluorenium intermediates 7 which possess nucleophilically displaceable 3 and/or 6 substituents. These intermediates are made in a two stage process beginning with an appropriately substituted 9H-fluoren-9-one 6, which in the first stage, shown in equation 1, is reacted with an appropriate organometallic reagent R*GR, wherein R* is an alkali metal; such as, Li, Na, K, Rb, or Cs; an alkaline earth metal; such as, Be, Mg, Ca, Sr, or Ba; or transition metals or metals of the B-group of the periodic table in the presence of an aprotic organic solvent which reaction results, after conventional aqueous acidic work-up, in the formation of carbinol intermediate 8.

Equation 1:

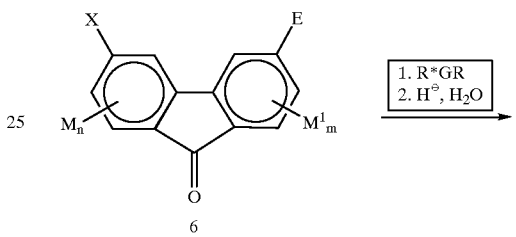

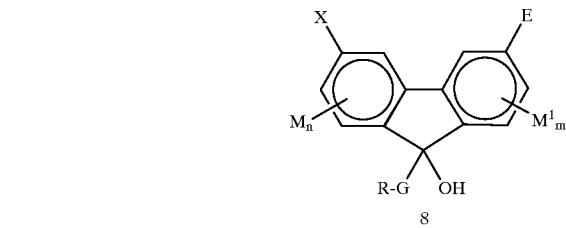

The second stage involves the reaction of the 9H-fluoren-9-ol 8 with a strong acid in non-aqueous aprotic or acidic organic solvent medium, preferably in the presence of a water binding reagent such as an acid anhydride or acid halide, to produce the key fluorenium intermediate 7 as shown in equation 2.

Equation 2:

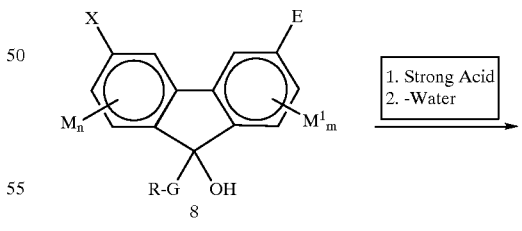

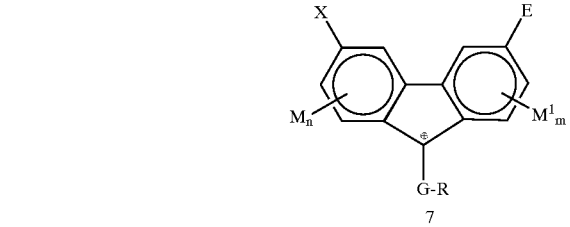

The novel fluorenium intermediates 7, by virtue of the nucleophilically replaceable substituents E being situated para to the electron-withdrawing carbonium ion at position 9, undergoes replacement with the hydrido-nucleophile $\ominus HZQq$ with concurrent loss of $H\oplus$, due to the presence of an excess of $\ominus HZQq$ or an ancillary base, to yield the 3H-fluoren-3-ylidene 1 as shown in equation 3.

Equation 3:

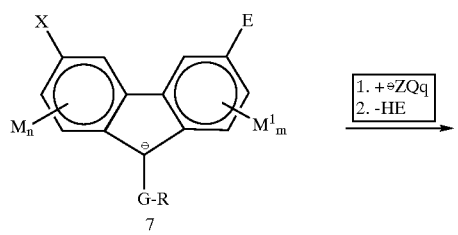

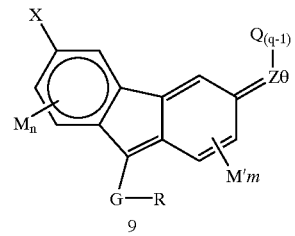

Analogous reaction of 7 with a Z,G'-dihydrido-Z-anionic nucleophile $\ominus HZQ_{(q-1)}G'H$ in the presence of excess base or with a Z-hydrido-Z,G'-dianionic nucleophile $\ominus HZQ_{(q-1)}G'H\ominus$ will result in the generation of the novel 3H-fluoren-3-ylidene nucleophile 10 as shown in equation 5.

Equation 5:

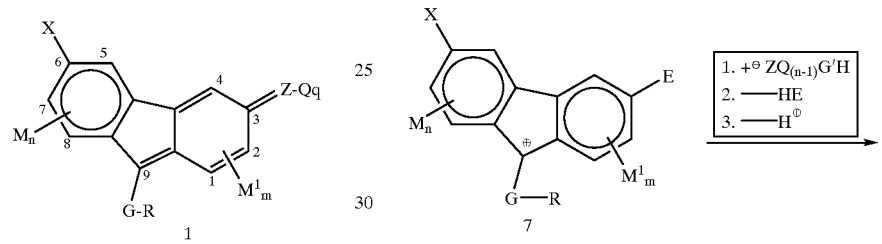

Similar reaction of 7 with a Z-dihydrido nucleophile $\ominus HZQ_{(q-1)}$ in the presence of excess base or with a Z-hydrido-Z-dianionic nucleophile $2\ominus HZQ_{(q-1)}$ will result in the generation of the novel 3H-fluoren-3-ylidene nucleophile 9 as shown in equation 4.

Equation 4:

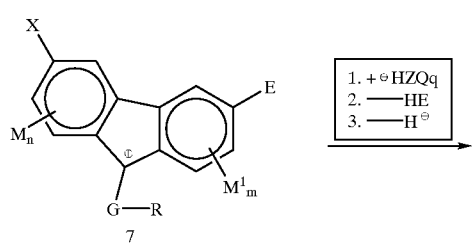

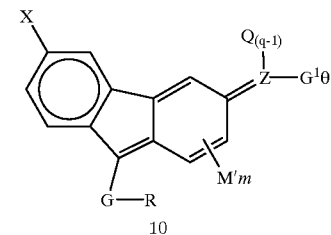

In the manner shown in equation 3, reaction of each molecule of 7 with of (o−1) molecules of 9, wherein the substituent X is nucleophilically displaceable, will result in the formation of the polymeric concatenated 3H-fluoren-3-ylidene 3 as shown in equation 6.

Equation 6:

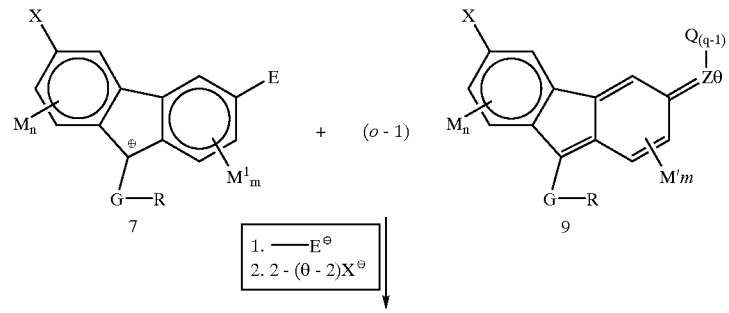

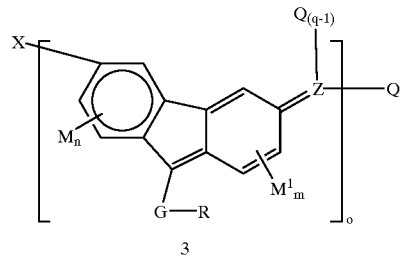

3

Similarly, in the manner shown in equation 6, reaction of each molecule of 7 with (p–1) molecules of 10, wherein the substituent X is nucleophilically displaceable will result in the formation of the polymeric concatenated 3H-fluoren-3-ylidene 4 as shown in equation 7.

Equation 7:

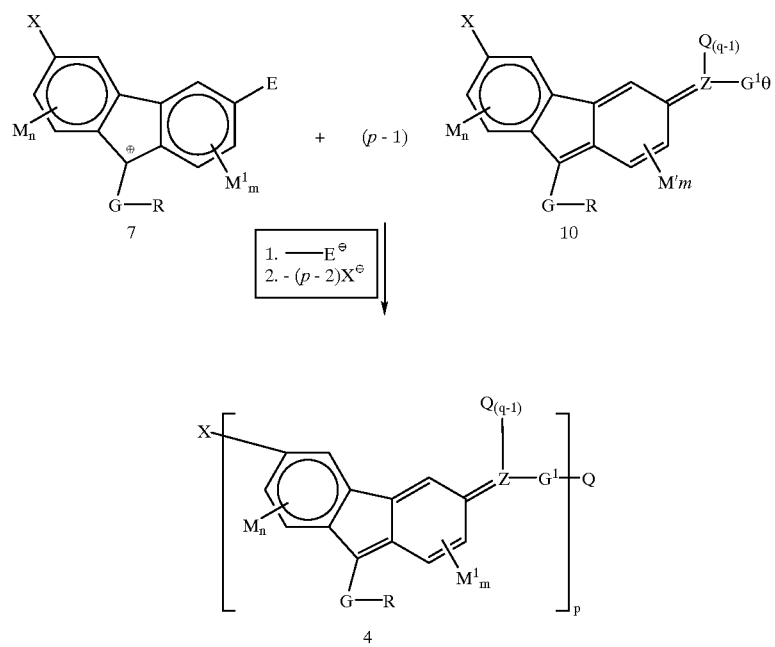

Concordantly, in the manner shown in both equation 6 and 7, reaction of each molecule of 7 with (o–1) molecules of 9 and (p–1) molecules of 10 will result in the formation of the polymeric concatenated 3H-fluoren-3-ylidene 5 as shown in equation 8.

Equation 8:

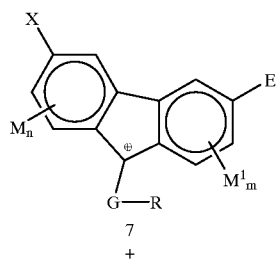

7
+

-continued

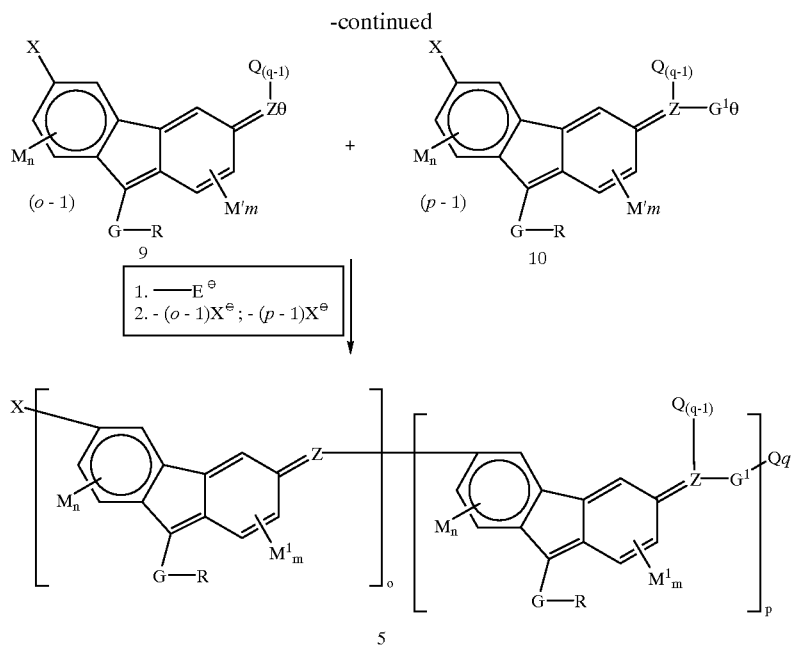

The nucleophilic reactions of equations 3 through 8 inclusive above are preferably conducted in the presence of a medium to high polarity aprotic organic solvent such as an ether, ester, ketone, amide, urea, amine, methane, carbonate, sulfoxide, sulfone, sulfonamide, sulfide, nitro compound, gem-dihalo compounds and their carbocyclic or heterocyclic analogues. The presence of a phase transfer catalyst or transition metal catalyst may be employed to promote the reaction. Examples of such solvents and catalysts are well known to those skilled in the art and are included in the books published by John Wiley and Sons, Inc. of New York, London, and Sydney in the series of volumes from 1967 to present and entitled: "Reagents for Organic Synthesis".

A broad range of appropriately substituted 3H-fluoren-3-ylidene compounds may be prepared by the above mentioned synthetic processes. However, certain highly chemically reactive substituents will not survive one or more steps of these processes and these compounds can be successfully produced by a secondary synthetic processes executed on certain performed 3H-fluoren-3-ylidenes employing synthetic techniques well known to those skilled in the art. A specific example will be presented to illustrate the simplicity, convenience, and efficacy of this approach.

3H-fluoren-3-ylidenes of structures 1 through 5 inclusive wherein there exists one or more methoxy ($CH_3O$—) substituents which are bound through the oxygen atom to an aromatic or aromatic heterocyclic carbon atom can be readily synthesized by the above processes. A general representation of such a methoxylated 3H-fluoren-3-ylidene would be: Fl-$(OCH_3)_r$, wherein: Fl- is the radical of the 3H-fluoren-3-ylidene system; —$OCH_3$ is the methoxyl radical; and r is the number, in the range: $1<=r<=12$, of methoxyl radicals substituted upon the aromatic and/or aromatic heterocyclic carbon atoms of the Fl radical. Such Fl-$(OCH_3)_r$ compounds will serve as excellent starting materials for the synthesis of a broad range of 3H-fluoren-3-ylidene compounds which are within the preferred embodiment of this invention. The strategy of this synthesis involves, in effort, replacement of the methyl group(s) of the methoxy function (s) with the desired substituent(s). Two such synthetic process strategies will be illustrated both generally and in detail: the direct replacement process and the indirect replacement process.

Both direct replacement and indirect replacement processes involve the same two initial synthetic steps. The first of these two steps involves replacement of the $CH_3$ group by hydrogen, a process which may be effected by a very broad range of synthetic procedures well known to those skilled in the art. One particularly mild procedure involves demethylation with boron tribromide in an organic solvent known not to react with this reagent by procedures available in the scientific literature as shown in equation 9. These procedures are well known to those skilled in the art and involve the use of an organic hydrocarbon or halogenated hydrocarbon solvents published in by articles in Chemistry and Industry, by J. F. W. McOmie and M. L. Watts in 1963, page 1658 entitiled: "Boron Tribromide—A Powerful Demethylating Reagent for Aromatic Ethers" and in Tetrahedron, volume 24, by J. F. W. McOmie and M. L. Watts in 1968, page 2289 entitled: "Demethylation of Aryl Methyl Ethers by Boron Tribromide". This process essentially converts the Fl-$(OCH_3)_r$ starting materials into the corresponding Fl-$(OH)_r$ intermediate. The second step involves replacement of the hydrogen atom of the OH group by a metal atom. This step is accomplished by a broad range of procedures well know to those skilled in the art including reaction under mild conditions of the Fl-$(OH)_r$ intermediate with n equivalents of an appropriately basic metallic derivative, such as, a metallic hydroxide $[E^*(OH)_s]$; metallic alkoxide $[E^*(OR)_s]$; metallic aryl $[E^*(Ar)_s]$; metallic amide $[E^*(NH_2)_s$; $E^*(NHR)_s$; or $E^*(NRR')_s]$; or metallic alkyl $[E^*(R)_s]$ wherein $E^*$ is the metal and s is its valence. This reaction will produce the corresponding salt: Fl-$(OE^*_{1/s})_r$. This salt is the starting material for both the direct and indirect replacement processes. The preparation of these salts (equation 10) and their nucleophilic displacement reactions of equations 11 through 16 inclusive, 18, and 20 through 25 below are preferable conducted in the presence of a medium to high polarity aprotic organic solvent such as an ether, ester, ketone, amide, urea amine, methane, carbonate, sulfoxide, sulfone, sulfonamide, sulfide, nitrocompound, gem-dihalocompound and their carbocyclic or heterocyclic analogues. The presence of a phase transfer catalyst or transition metal catalyst may be employed to promote the reactions.

Reactions with chloro-substituted alkylating intermediates may be formulated by the presence of a metallic or quaternary iodide. The reactions of equations 21 through 25 inclusive may optionally be conducted in the presence of an organic aprotic tertiary amine or their carbocyclic or heterocyclic analogues. Examples of such solvents, catalysts and amines are well known to those skilled in the art and are included in the books published by John Wiley and Sons, Inc. of New York, London, and Sydney in the series of volumes from 1967 to present and entitled: "Reagents for Organic Synthesis".

Equation 9:

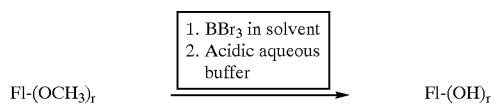

Equation 10:

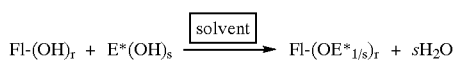

In the direct replacement process the metal atom of the salt, $Fl\text{-}(OE^*_{1/s})_r$, is directly replaced by the desired substituent: Su. This process is effected by reaction of this salt in an appropriate solvent with g equivalents of the reagent ESu wherein E is a nucleophilic replaceable group of sufficient chemical reactivity to be amenable to the reaction of equation 11.

Equation 11:

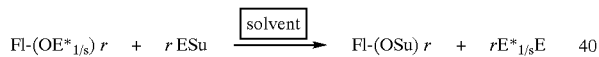

In the indirect replacement process the metal atom of the salt, $Fl\text{-}(OE^*_{1/s})_r$, is intermediately replaced by a bridging function or blocked function: Bg. In a manner similar to the direct replacement process this intermediate transformation is effected by reaction of this salt in an appropriate solvent with r equivalents of the reagent EBg, wherein E is a nucleophilically replaceable group of sufficient chemical reactivity to be amenable to the reaction of equation 12.

Equation 12:

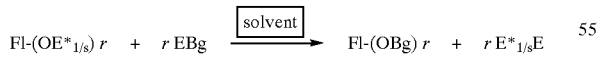

The final step of the indirect process includes reaction of the $Fl\text{-}(OBg)_r$ intermediate with a reagent appropriate to the append the desired substituent Su upon the Bg function or to release a blocking group to produce desired substituted product: $Fl\text{-}(OGSu)_r$ wherein G is a bridging group which attaches the substituent Su to the oxygen atoms shown in equation 13. Such reaction might involve addition of Su to the Bg group or replacement of one or more atoms of the Bg group by Su, or release of a blocking group on Su.

Equation 13:

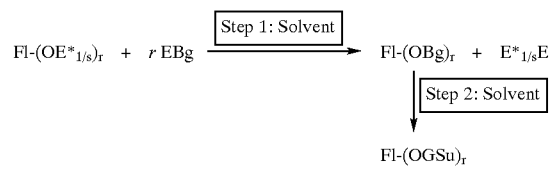

A major class of 3H-fluoren-3-ylidene compounds within the preferred embodiment of this invention which are best prepared by either the direct or indirect replacement process are such compounds with polymerizable substituents: -T. Such polymerizable substituents, T, may be covalently attached to the 3H-fluoren-3-ylidene framework by simply reacting the above described metallic reagent $Fl\text{-}(OE^*_{1/s})_r$ with r equivalents of a reagent of structure ET, wherein E is a nucleophilically replaceable group amenable to the reaction shown in equation 14.

Equation 14:

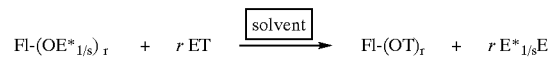

Examples of ET intermediates which generate monomers which are capable of undergoing addition polymerization via reactive double bonds and applicable to equation 14, are such derivatives wherein E is chlorine and the intermediate is therefore ClT and which include:

carbonyl chlorides including:
acryloyl chloride, methacryloyl chloride, α-chloroacryloyl chloride, α-cyanoacryloyl chloride, 4-vinylbenzoyl chloride, 3-vinylbenzoyl chloride, vinyl chloroformate, 2-propenyl chloroformate, allyl chloroformate, N-methyl-N-(4-vinylbenzyl)-carbamoyl chloride, N-methyl-N-(3-vinylbenzyl)-carbamoyl chloride, N-ethyl-N-(2-acryloyloxyethyl)-carbamoyl chloride, N-ethyl-N-(2-methacryloyloxyethyl)-carbamoyl chloride, N,N-bis(2-acryloyloxyethyl)-carbamoyl chloride, N,N-bis(2-methacryloyloxyethyl)-carbamoyl chloride, N,N-bis(2-methacryloyloxyethyl)-carbamoyl chloride, 1-chlorocarbonyl-4-acryloyl-piperazine, 1-chlorocarbonyl-4-methacryloyl-piperazine, 1-chlorocarbonyl-4-(4-vinylbenzoyl)-piperazine, 1-chlorocarbonyl-4-(3-vinylbenzoyl)-piperazine;

methyl chlorides including:
3-(chloromethyl)styrene, 4-(chloromethyl)styrene, chloromethyl vinyl ketone, chloromethyl 2-propenyl ketone, chloromethyl vinylether, chloromethyl 2-propenyl ether, chloromethyl 4'-styryl ether, chloromethyl acrylate, chloromethyl methacrylate, chloromethyl 4-vinylbenzoate, chloromethyl 3-vinylbenzoate, chloromethyl 4-vinylbenzyl ether, chloromethyl 3-vinylbenzyl ether;

and, ethyl chlorides including:
3-(2-chloroethyl)styrene, 4-(2-chloroethyl)styrene, 2-chloroethyl vinyl ketone, 2-chloroethyl 2-propenyl ketone, 2-chloroethyl vinyl ether, 2-chloroethyl 2-propenyl ether, 2-chloroethyl 4'-styryl ether, 2-chloroethyl acrylate, 2-chloroethyl methacrylate, 2-chloroethyl 4-vinylbenzoate, 2-chloroethyl 3-vinylbenzoate, 2-chloroethyl 4-vinylbenzyl ether, 2-chloroethyl 3-vinylbenzyl ether, N-(2-chloroethyl)-N-methylacrylamide, N-(2- chloroethyl)-N-ethylmethacrylamide, 3-[2-(2-chloroethoxy)-ethyl] styrene, 4-[2-(2-chloroethoxy)-ethyl] styrene, 2-(2-chloroethoxy)-ethyl acrylate, 2-(2-chloroethoxy)-ethyl methacrylate, 2-(2-chlorothoxy)-ethyl 4-vinylbenzoate, 2-(2-chloroethoxy)-ethyl 3-vinylbenzoate, 2-(2-chlorothoxy)-ethyl 4'-styryl ether, 2-(2-chloroethoxy)-ethyl 4-vinylbenzyl ether, 2-(2-chlorothoxy)-ethyl 3-vinylbenzyl ether, N-[2-(2-chlorothoxy)-ethyl]-N-ethylacrylamide, N-[2-(2-chlorothoxy)-ethyl]-N-methylmethacrylamide, 2-[2-(2-chloroethoxy)-ethyl]ethyl acrylate, 2-[2-(2-chloroethoxy)-ethyl]-ethyl methacrylate, 2-[2-(2-chloroethoxy)-ethyl]-ethyl 4-vinylbenzoate 2-[2-(2-chloroethoxy)-ethyl]-ethyl 3-vinylbenzoate, 2-[2-(2-chloroethoxy)-ethyl]-ethyl 4'styryl ether, 2-[2-(2-chloroethoxy)-ethyl]-ethyl 4-vinylbenzyl ether, 2-[2-(2-chloroethoxy)-ethyl]-ethyl 3-vinylbenzyl ether.

Examples of ET intermediates which generate aliphatic polyol monomers which are capable of undergoing either addition polymerization or condensation polymerization in reaction, for example, with diisocyanates (addition) or with dicarbonyl chlorides (condensation) and applicable to equation 15 wherein r is in the range: $2<=r<=12$, are such derivatives wherein E is chlorine and the intermediate is therefore CIT and which include:

2-chloroethanol, 1-chloro-2-propanol, 3-chloro-1-propanol, 1-chloro-2-butanol, 4-chloro-2-butanol, 4-chloro-1-butanol, 1-chloro-2-pentanol, 1-chloro-3-pentanol, 5-chloro-2-pentanol, 5-chloro-1-pentanol, 1-chloro-2-pentanol, 5-chloro-1-pentanol, 1-chloro-2-hexanol, 1-chloro-3-hexanol, 6-chloro-3-hexanol,6-chloro-2-hexanol, 6-chloro-1-hexanol, 2-(2-chloroethoxy)-ethanol, 2-[2-(2-chloroethoxy)ethyl]-ethanol, 4-(hydroxymethyl)-benzyl chloride, 4-(2-hydroxyethyl)-benzyl chloride, 4-(2-hydroxyethoxy)-benzyl chloride, hydroquinone 2-chloroethyl 2-hydroxyether ether.

Equation 15:

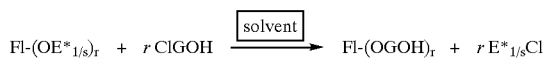

Examples of ET intermediates which are capable of generating polyamine monomers which are capable of undergoing either addition polymerization or condensation polymerization in reaction, for example, diisocyanates (addition) or with dicarbonyl chlorides (condensation) and applicable to equation 16, wherein r is in the range: $2<=r<=12$, are such derivatives wherein E is chlorine and the intermediate is the chloro carbamate: $CIGN(R)CO_2Et$, and which include the following ethyl carbamates which, following the reaction of equation 11 are hydrolyzed to the corresponding amine, $Fl(OGNHR)_r$, with loss of carbon dioxide and ethanol by action of aqueous hydroxides of the type $E^*(OH)_s$ as shown in equation 17. These carbamate intermediates include:

ethyl N-(2-chloroethyl) carbamate, ethyl N-methyl N-(2-chloroethyl) carbamate, ethyl N-(1-chloro-2-propyl) carbamate, ethyl N-methyl N-(1-chloro-2-propyl) carbamate, ethyl N-(3-chloro-1-propyl) carbamate, ethyl N-methyl N-(3-chloro-1-propyl) carbamate, ethyl N-(1-chloro-2-butyl) carbamate, ethyl N-methyl N-(1-chloro-2-butyl) carbamate, ethyl N-(4-chloro-2-butyl) carbamate ethyl N-(methyl N-(4-chloro-2-butyl) carbamate, ethyl N-(4-chloro-1-butyl) carbamate, ethyl N-(methyl N-(4-chloro-1-butyl) carbamate, ethyl N-(5-chloro-1-pentyl) carbamate, ethyl N-methyl N-(5-chloro-1-pentyl) carbamate, ethyl N-(6-chloro-1-hexyl) carbamate, ethyl N-methyl N-(6-chloro-1-hexyl) carbamate, ethyl N-(4-chloromethyl benzyl) carbamate, ethyl N-methyl N-(4-chloromethylbenzyl) carbamate, ethyl N-[2-(2-chloroethoxyl)-ethyl] carbamate, ethyl N-methyl N-[2 -(2-chloroethoxy)-ethyl] carbamate, ethyl N-[4-(2-chloroethoxy)-phenoxy-2-ethyl] carbamate, ethyl N-methyl N-[4-(2-chloroethoxy-phenoxy-2-ethyl] carbamate.

Equation 16:

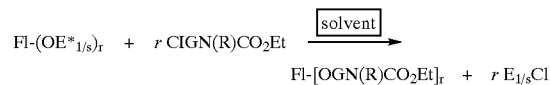

Equation 17:

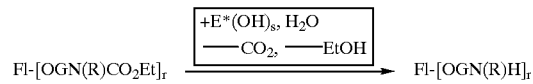

Examples of ET intermediates which are capable of generating polycarboxylate monomers which are capable of undergoing condensation polymerization reactions and applicable to equation 18 wherein r is in the range: $2<=r<=12$, are such derivatives wherein E is chlorine and the intermediate is the chloroester: $CIGCO_2Et$, and which include the following ethyl esters which are hydrolized to the corresponding carboxylic acid with loss of ethanol by aging of aqueous hydroxides (saponification) of type $E^*(OH)_s$ followed by acidification with r equivalents of hydrogen chloride as shown in equation 19. These chloroester intermediates include:

ethyl chloroacetate, ethyl 2-chloropropionate, ethyl 3-chloropropionate, ethyl 2-chlorobutyate ethyl 3-chlorobutyrate, ethyl 4-chlorobutyrate, ethyl 2-chlorovalerate, ethyl 3-chlorovalerate, ethyl 4-chlorovalerate, ethyl 5-chlorovalerate, ethyl 2-chlorohexanoate, ethyl 3-chlorohexanoate, ethyl 4-chlorohexanoate, ethyl 5-chlorohexanoate, ethyl 6-chlorohexanoate, ethyl 4-(chloromethyl(benzoate, ethyl 3 -(chloromethyl)benzoate, ethyl 4-(chloromethyl)phenylacetate, ethyl 3-(chloromethyl) phenylacetate, ethyl 4-(2-chloroethyl)benzoate, ethyl 3-(2-chloroethyl)benzoate, ethyl 4-(2-chloroethoxy) benzoate, ethyl 3-(2-chloroethoxy) benzoate, ethyl 4-(2-chloroethoxy)phenylacetate, ethyl 3-(2-chloroethoxy)phenylacetate, ethyl 4-(2-chloroethoxy) phenoxyacetate, ethyl 3-(2-chloroethoxy) phenoxyacetate, ethyl 2-(2-chloroethoxy)acetate, ethyl 2-(2-chloroethoxy)propionate, ethyl 2-[2-(2-chloroethoxy)ethoxy] acetate and ethyl 3-[2-(2-chloroethoxy)ethoxy]propionate.

Equation 18:

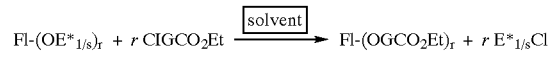

Equation 19:

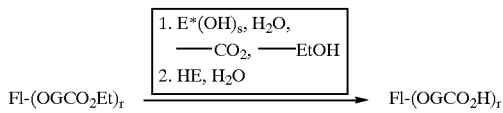

Examples of ET intermediates which are capable of generation of polyhalide monomers which are capable of undergoing condensation polymerization with halide elimination and applicable of equation 20 wherein r>=2 and wherein this synthesis is conducted with an excess of the ET intermediates corresponding to greater than 2 r equivalents, are such derivatives wherein E is bromine and the intermediate is therefore BrT and which include:

dibromomethane, 1,2-dibromothane, 1,3-dibromopropane, 1,4-dibromobutane, 1,5-dibromopentane, 1,6-dibromohexane, 1,7-dibromoheptane, 1,8-dibromooctane, 1,9-dibromononane, 1,10-dibromodecane, 1,12-dibromododecane, 1,13-dibromotridecane, 1,14-dibromotetradecane, 1,15-dibromopentadecane, 1,16-dibromohexadecane, 1,17-dibromoheptadecane, 1,18-dibromooctadecane, 1,19-dibromononadecane, 1,20-dibromoeicosane, 1,21-dibromoeicosane, 1,22-dibromodocosane, 1,3-bis(bromomethyl) benzene, 1,4-bis(bromomethyl) benzene, 1,3-bis(2-bromoethyl) benzene, 1,4-bis(2-bromoethyl) benzene, 1,3-bis(2-bromoethoxy) benzene, 1,4-bis(2-bromoethoxy) benzene, bis(2-bromoethyl) ether, bis(3-bromo-1-propyl) ether, bis(4-bromo-1-butyl) ether, 1,2-bis(2-bromoethoxy)ethane, bis[2-(2-bromoethoxy)-ethyl] ether, 1,2-bis[2-(2-bromoethoxy)-ethoxy]-ethane, trans-1,4-dibromo-2-butene, 1,3-dibromoacetone, 1,5-dibromo-3-pentanone, bis(2-bromoethyl) carbonate, bis(3-bromo-1-propyl) carbonate, 1,4-bis(bromoacetyl) piperazine, 1,4-bis(3-bromopropionyl) piperazine, bis(2-bromoethyl) sulfide, bis(2-bromoethyl) selenide, bis(2-bromoethyl) telluride, N,N'-bis(2-bromoethyl)N-N'-dimethylurea, and 2,6-bis(2-bromoethoxy) naphthalene.

Equation 20:

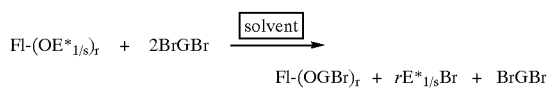

The above described T-group functionalized 3H-fluoren-3-ylidenes may be utilized as intermediates for synthesis of other important classes of T-substituted products. These products include isocyanates and isothiocyanates, carbamoyl chlorides and thicarbamoyl chlorides, chloroformates and thiochloroformates, carbonyl chlorides and two classes of polymerizable esters.

The 3H-fluoren-3-ylidenes with aliphatic primary amine functions, prepared by equations 17 and 18 wherein R=H, can be reacted with excess phosgene (Z=O) or thiophosgene (Z=S) in the presence or absence of a tertiary alkyl amine acid binder (to remove HCl) in a manner well known to those skilled in the art to form the corresponding isocyanates (Z=O) and isothiocyanates (Z=S) respectively as shown in equation 21. These products undergo addition polymerization with polyols, to form polymethanes, or polyamines, to form polyureas.

Equation 21:

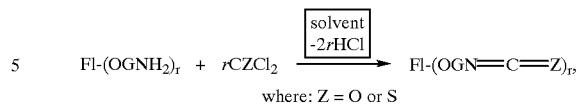

The 3H-fluoren-3-ylidenes with aliphatic secondary amine functions, prepared by equations 16 and 17 wherein $R=CH_3$, can be reacted with excess phosgene (Z=O) or thiophosgene (Z=S) in the presence or absence of a tertiary alkyl amine acid binder (to remove HCl) in a manner well known to those skilled in the art to form the corresponding carbamoyl chlorides (Z=O) and thiocarbamoyl chlorides (Z=S) respectively as shown in equation 22. These products will undergo condensation polymerization with HCl elimination on reaction with polyols, to form polymethanes when Z=O and polythiomethanes when Z=S, and polyamines, to form polyureas when Z=O and polythioureas when Z=S.

Equation 22:

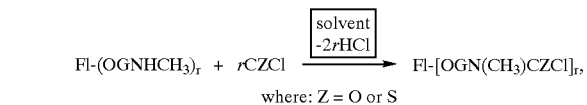

3H-fluoren-3-ylidenes with aliphatic primary alcoholic functions, prepared by equation 15, can be reacted with excess phosgene (Z=O) or thiophosgene (Z=S) in the presence of a tertiary alkyl amine acid binder (to remove HCl) in a manner well known to those skilled in the art to form the corresponding chloroformic esters (Z=O) and thiochloroformic esters (Z=S) respectively as shown in equation 23. These products undergo condensation polymerization with HCl elimination on reaction with polyols, to form polycarbonates when Z=O and polythiocarbonates when Z=S, and polyamines, to form polyureas when Z=O and polythioureas when Z=S.

Equation 23:

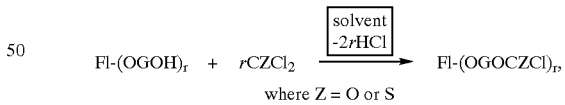

The 3H-fluoren-3-ylidenes with carboxylic acid functions, prepared by equations 18 and 19, can be reacted with excess phosgene, thionyl chloride, phosphorus panterchloride, phosphoryl trichloride, phosphorus trichloride, or other reagents well known to those skilled in the art for the direct conversion of carboxylic acids to carbonyl chlorides to form the corresponding carbonyl chloride as shown in equation 24, wherein thionyl chloride is used as an example. These carbonyl chloride products under condensation polymerization with HCl elimination on reaction with polyols, to form polyesters, polythiols, to form polythioesters, and polyamines to form polyamides.

Equation 24:

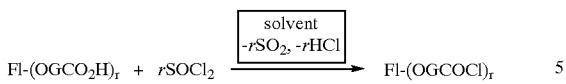

The 3H-fluoren-3-ylidenes with aliphatic primary alcoholic functions, prepared by equation 15, can be reacted with a carbonyl chloride, TCOCl, possessing an addition polymeriable carbon to carbon double bond in the presence of an acid binding tertiary aliphatic amine (to remove by-product HCl) as shown in equation 25. The product of this reaction is a 3H-fluoren-3-ylidene ester, Fl-(OGOCOT)$_r$, which possess addition polymerizable T-functional groups. Examples of TCOCl intermediates appropriate to this process are:

acryloyl chloride, methacryloyl chloride, α-chloroacryloyl chloride, α-cyanoacryloyl chloride, 4-vinylbenzoyl chloride, 3-vinylbenzoyl chloride, vinyl chloroformate, 2-propenyl chloroformate, allyl chloroformate, N-methyl-N-(4-vinylbenzyl)-carbamoyl chloride, N-methyl-N-(3-vinylbenzyl)-carbamoyl chloride, N-ethyl-N-(2-acryloyloxyethyl)-carbamoyl chloride, N-ethyl-N-(2-methacryloyloxyethyl)-carbamoyl chloride, N,N-bis(2-acryloyloxyethyl)-carbamoyl chloride, N,N-bis(2-methacryloyloxyethyl)-carbamoyl chloride, N,N-bis(2-methacryloyloxyethyl)-carbamoyl chloride, 1-chlorocarbonyl-4-acryloyl-piperazine, 1-chlorocarbonyl-4-methacryloyl-piperazine, 1-chlorocarbonyl-4-(4-vinylbenzoyl)-piperazine, 1-chlorocarbonyl-4-(3-vinylbenzoyl)-piperazine.

Equation 25:

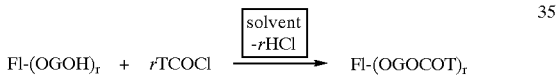

Employing conventional procedures, well known to those skilled in the art, either the 3H-fluoren-3-ylidene carboxylic acids produced by equation 18 and 19 or the 3H-fluoren-3-ylidene carbonyl chlorides made by equation 24 can be converted into their corresponding esters, Fl-(OGCO$_2$T)$_r$, wherein T is an additional polymerizable olefinic group which includes T-groups:

vinyl, 2-propenyl, allyl, methallyl, 4'styryl, 3-vinylbenzyl, 4-vinylbenzyl, 3-vinyl-2-phenethyl, 4-vinyl-2-phenethyl, 2 -vinyloxyethyl, 2-(2-propenyloxy)-ethyl, 2-allyoxyethyl and 2-methallyoxyethyl.

The above synthetic process as shown in equation 14 can be clearly envisioned as a highly generalizable method of appending any Su functional group capable of chemically withstanding the conditions of this reaction. Such Su groups could therefore include:

Y is a polymerization-initiating group; the polymerization-initiating group being an α,β-dione of 2 to 22 carbons; an azoalkane of 1 to 21 carbons; an alkylperoxide of 1 to 21 carbons, a hydroperoxide of 0 to 20 carbons; a peroxide ester of 1 to 21 carbons; a persulfonate of 0 to 20 carbons; an α,β-disulfone of 0 to 20 carbons; an ester of 1 to 21 carbons; an ether of 1 to 21 carbons; an alcohol of 1 to 21 carbons; an amine of 1 to 41 carbons; a sulfonic acid of 0 to 20 carbons; a carboxamide of 1 to 21 carbons; an acid methyl of structure —CHA$^1$ A$^2$ of 1 to 31 carbons; a substituted cyclopropane of 3 to 23 carbons; a substituted cyclobutane of 4 to 24 carbons; a substituted iodonium group of 1 to 31 carbons; a substituted sulfonium group of 2 to 42 carbons; and other polymerization initiating group known to those skilled in the art: Substituents on the polymerization-initiating group being J, L, R$^1$, R$^2$, G-R, G-Q, G-T, G-R*, Q, T, or R*; and, R* is a chemically reactive group. Examples of such chemically reactive groups are reactive halides, such as, carbonyl halides of 1 to 2 carbons; sulfonyl halides of 0 to 20 carbons; sulfinyl halides of 0 to 20 carbons; phosphoryl halides of 0 to 20 carbons; imidyl halides of 1 to 21 carbons; alkyl halides of 1 to 31 carbons; α-haloesters of 1 to 31 carbons; a-haloketones of 1 to 31 carbons; aryl halides of 6 to 32 carbons; heterocyclyl halides of 1 to 22 carbons and 1 to 21 heteroatoms one or more of which may be N, P, O, S, Se, and Te; cycloalkyl halides of 2 to 32 carbons. In addition, such reactive R* groups may be reactive unsaturated groups, such as, isocyanates; isothocyanates; ketenes; olefines; acetylenes, allenes; ketones; α,β-diones; α,β,γ-triones; imines; α,β-diimines; azides; carbodimides; unsaturated ketones, esters, sulfonones, sulfonamides, and sulfonates; and carbon double bonded to heteroactoms, such as, P, S, Se, and Te. Additionally, R* group may be groups which react with the sited halides and unsaturated groups including alcohols of 1 to 21 carbons; carboxylic acids of 1 to 21 carbons; sulfonic acids of 0 to 20 carbons; carboxamides of 1 to 21 carbons; sulfonamides of 0 to 20 carbons; amines of 1 to 30 carbons; aryl groups of 6 to 36 carbons; heteroaryl groups of 1 to 22 carbons and 1 to 21 heteroatoms one or more of which may be N, P, O, S, Se, or Te; mercaptans of 0 to 21 carbons; phosphates; alkali metals, such as, Li, Na, K, Rb, and Cs; alkaline earth metals, such as, Be, Mg, Ca, Sr, and Ba; transition metals; and metals of the B-group of the periodic table. R* groups are such chemically reactive groups which are capable of covalently attaching the subject 3H-fluoren-3-ylidenes to another chemically reactive moiety or matrix.

The Preferred Embodiment of the Invention:
Detailed Description of Materials and Synthetic Processes for Same The subject 3H-fluoren-3-ylidene's of this invention may, for application in a broad range of possible environmental sensor application be utilized directly as the 3H-fluoren-3-ylidene compounds described and synthesized in the two sections above or as materials for specific applications which are derived from these compounds. Such material would contain from 1 part per trillion to 100% of a 3H-fluoren-3-ylidene compound which may be substituted as indicated above or further elaborated to promote compatibility or integration with the overall materials as described in detail below.

Such a material may, within the scope of the preferred embodiment of this invention, be 3H-fluoren-3-ylidenes dissolved or otherwise integrated into a fluid medium, such as, a gas, liquid, critical fluid or super-critical fluid. Similarly the 3H-fluoren-3-ylidenes may be dissolved or otherwise integrated into a semisolid materials or a solid material. These materials include liquid crystalline materials, crystalline materials, biomolecular materials, and polymeric materials. The integration may be achieved through direct application of a substituted 3H-fluoren-3-ylidene compound described above or as a 3H-fluoren-3-ylidene radical covalently bound to a secondary sensor materials or a polymeric materials both described below.

In a manner not intended to limit the scope of this invention but to provide specific exemplification of subject materials, one embodiment of each of these materials wherein the essential optically or electrooptically active novel 3H-fluoren-3-ylidene radical is covalently bound to a secondary sensor material and a linear and crosslinked organic polymeric material, is describe in detail below. Included are specific non-limiting examples of electrooptical materials wherein the electrooptically active novel 3H-fluoren-3-ylidene radical is covalently bound to a linear or crosslinked organic polymeric materials will be described in detail. The synthesis and fabrication of materials for the sensor and EO device applications exemplified are well known to those skilled in the art. For sensor applications these are described in the book published in 1994 by Plenum Press of New York and London entitled "Topics in Fluorescence Spectroscopy Volume 4, Probe Design and Chemical Sensing". For EO device, OIC, and systems applications these are described in an article published in the March 1996 issue of *Chemical and Engineering News* entitles: "Devices Based on Electro-optic Polymers Begin to Enter the Marketplace" and the paper published in volume 34 and pages 1554 to 1561 inclusive of the Mar. 20, 1995 issue of the journal of Applied Optics entitled: "Experimental Studies of Electro-optic Polymer Modulators and Waveguides".

Sensor Materials: Detailed Description and Synthetic Processes

While the 3H-fluoren-3-ylidene compounds described above are highly sensitive to very small changes in their local environment with respect to optical emission, absorption and/or refraction this sensitivity can be considerably increased to certain very specific types of environmental change by employing an appropriately substituted 3H-fluoren-3-ylidene wherein the 3H-fluoren-3-ylidene radical is covalently attached to a secondary sensor material. Such a secondary sensor material would be chosen to undergo a change in its molecular structure or induce a change in the local molecular matrix which is highly specific to an entity of which it is desirable to detect or monitor in the surrounding environment. This covalently 3H-fluoren-3-ylidene functionalized sensor material is applicable in broad possible ranges of applications in communications and information technology, electronic devices and systems, and environmental, biological, and medicinal devices and systems. One such specific example, without intentionally limiting the scope of this invention, described in detail below is that of a biomedical sensor. Such a biomedical sensor may be applied in all living biological entities; however, in a manner not to limit the scope of this invention, the human body or animal is the subject of this specific example.

A covalently 3H-fluoren-3-ylidene functionalized sensor material may be utilized effectively in any part or organ of an animal or human body; however, to provide a non-limiting example of the practical use of such a material, a specific application in which important entities in the blood or dermal tissue of animals or human beings are monitored or detected is presented. Such entities of interest to scientists, environmentalists, clinicians, veterinarians, and physicians induce glucose, electrolytes, heavy metals, carbon dioxide, oxygen, antibodies, acidity and/or alkalinity and the like. While all of these and a broad range of other entities can be determined or monitored with 3H-fluoren-3-ylidene functionalized sensor materials, a specific non-limiting example provided below is that of a glucose sensor material based on 3H-fluoren-3-ylidenes.

Employing modem fluoroscopic or fiber optic methodologies well known to those skilled in the art, glucose levels can be determined with appropriately applied 3H-fluoren-3-ylidene functionalized glucose sensor materials, anywhere with the animal or human body, a specific non-limiting example of application of such a material capable of determining or monitoring glucose levels in the tissue fluids and blood at the surface (dermal) just below the surface (subdermal) of the skin of the animal or human being is given below.

It is well known to those skilled in the art, that the readily available protein Concanavalin A (Hcon) selectively and reversibly binds glucose with concordant changes in its overall present molecular structure. Further, it is known that HCon can be functionalized as shown in equation 26 with substituted organic carbonyl chlorides [SuC(O)Cl] in such a manner that their results an elimination ion of HCl with the formation of the correspondingly substituted organic carbonyl derivative of Concanavalin A [SuC(O)Con] wherein the substituted carbonyl radical [SuC(O)—] is covalently bound to Concanavalin A in such a manner not to greatly change the glucose interaction properties of the unfunctionalized Hcon. Therefore, this functionalized glucose sensor material can be used to measure glucose levels in the local environment by virtue of a substantial difference in the environment of substituent in the glucose-free versus glucose associated HCon secondary sensor protein.

Equation 26:

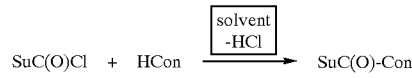

Concordant with synthetic process of equation 24, 3H-fluoren-3-ylidenes with reactive carbonyl chloride substituents, Fl-(O-G-COCl)$_r$, can be synthesized by conventional methods. In the specific, non-limiting case wherein r=1, this functionalized intermediates would be represented by the formula: Fl-O-G-C(O)Cl. Reaction of the latter compound with HCon under the conditions of equation 26 with elimination of HCl will result in the formation of a 3H-fluoren-3-ylidene functionalized derivative of Concanavaline A, Fl-O-G-Cl(O)-Con, wherein the 3H-fluoren-3-ylidene system subject in this invention is covalently bound to the HCon glucose sensor protein via a carbonyl substituent, as shown in equation 27.

Equation 27:

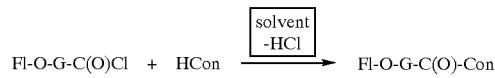

The HCon functionalized 3H-fluoren-3-ylidene, Fl-O-G-C(O)-Con, will, in analogy to the prior art, reversibly bind glucose, Gl, as shown in the equilibrium equation of equation 28 to form the glucose ligated analogue: Fl-O-G-C(O)-Con←Gl. This analogue should differ somewhat in its optical emission, absorption and/or refraction properties as compared to the uncomplexed analogue: Fl-O-G-C(O)-Con. Therefore the levels of glucose in the environment may be determined and/or monitored by instrumentation appropriate to the measurement of these optical properties by comparison with a calibration curve determined from similar systems containing known glucose levels.

Equation 28:

Alternatively, in an example also well-known to those skilled in the art, the FRET (fluorescence resonance energy transfer) mechanism and methodology may be employed to effect glucose determination and/or monitoring. Employing FRET, and in analogy to the application of known SuC(O)-Con materials, can produce a complex between a polymeric analogue of glucose, dextran=Dx, in which the dextran is functionalized with a fluorescence quenching group, -Fq: Dx-Fq. As with glucose in equation 28, the latter functionalized dextran forms a strong but reversible, complex, Fl-O-G-C(O)-Con←Dx-Fq, with functionalized HCon derivatives, such as, the novel Fl-O-G-C(O)-Con as shown in equation 29.

Equation 29:

The functionalized dextran complex Fl-O-G-(O)-Con←Dx-Fq may, by analogy with known art be employed as a glucose sensor material by virtue of its interaction with glucose to reversibly generate the glucose complex Fl-O-G-C(O)-Con←Gl in the presence of tissue glucose as shown in equation 30.

Equation 30:

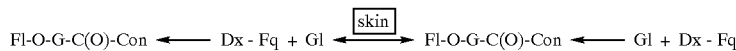

In analogy with know art, selection of an appropriate quencher function, -Fq, will result in a particularly sensitive tissue-glucose sensor system based on the greatly different luminescence emission intensity, phase angle and/or lifetime in the media of equation 30, wherein Fl-OGC(O)-Con←Dx-Fq is the 3H-fluoren-3-ylidene functionalized glucose sensor molecule.

In actual practice as a practical glucose sensor material the 3H-fluoren-3-ylidene functionalized glucose sensor molecule is incorporated into a material matrix.

A major class of materials, highly preferred in the embodiment of this invention, and very well known to those skilled in the art, are organic polymers. Such polymers are produced by a highly repetitive chemical reaction, called polymerization, wherein a chemical intermediate, called a monomer, is induced to undergo polymerization either with itself (homopolymerization) or with another monomer (copolymerization or condensation polymerization). The manner in which the polymerization process is conducted is well know to those skilled in the art. Such polymerization may, for example, be induced by absorption of light (photopolymerization), application of heat (thermal polymerization) or addition of an appropriate quantity of a chemical agent or initiator.

Monomers are those chemicals or molecules which readily undergo the polymerization process by virtue of their ability to undergo efficiently three kinds of chemical reactions which result in the development of a continuum of covalent bonds between consecutive monomers. These chemical reactions are:

1. addition polymerization wherein the monomer, which embodies a reactive unsaturated linkage, is capable of forming covalent bonds by addition to this linkage;
2. hydrogen donor polymerization wherein the monomer, which embodies a reactive hydrogen atom, is capable of forming a covalent bond by substitution of this atom in a reaction with either an addition polymerization monomer or a nucleophilic replacement monomer; and
3. nucleophilic replacement polymerization wherein the monomer, which embodies a reactive nucleophillically replaceable group, is capable of forming a covalent bond by replacement of this reactive group in a reaction with a hydrogen donor monomer.

Monomers which undergo addition polymerization are of two kinds: mono-functional addition monomers and poly-functional addition monomers. Mono-functional addition monomers are those in which but one unsaturated linkage is capable of undergoing the addition polymerization. These monomers are generally represented by the formula; Ma-R, wherein Ma- is the reactive unsaturated group and -R is the remainder of the molecule which is called: the functional group. Poly-functional addition monomers are those which possess more than one reactive unsaturated group and are generally represented by the formula: $(Ma)_t$-G, wherein Ma- is the reactive unsaturated group, t is the number of such groups (usually in the range of 2–2,000,000) and -G is the remainder of the molecule which is called: the bridging group. Two particularly important classes of poly-functional addition monomers are those in which t=2; these are called: bifunctional addition monomers, which are represented by the formula: Ma-G-Ma; and tri-functional additional monomers, wherein t=3 and which are represented by the formula: Ma-G(Ma)-Ma.

Monomers which undergo hydrogen donor polymerization are of two kinds: bi-functional hydrogen monomers and poly-functional hydrogen donor monomers. Bi-functional hydrogen donor monomers are those in which two reactive hydrogen atoms are capable of undergoing replacement in the polymerization process. These monomers are generally represented by the formula: HMh-G-MhH, wherein H- is the reactive replaceable hydrogen atom, -Mh- is the reactive nucleophilic group directly attached to the replaceable hydrogen atom, and -G- is the remainder of the molecule which is called: the bridging group. Poly-functional hydrogen donor monomer, which are represented by the formula: $HMR-G(MhH)_t$-MhH, wherein t is the number of HMh groups in excess of 2 (usually in the range of 1–2,000,000) and where HMh- and -G- are defined above. Two particularly important classes of poly-functional hydrogen donor monomers are those in which t=1: tri-functional hydrogen donor monomers, and t=2: tetra-functional hydrogen donor monomers.

Monomers which undergo nucleophilic replacement polymerization are of two kinds: bi-functional nucleophilic replacement monomers and poly-functional nucleophilic replacement monomers. Bi-functional nucleophilic replacement monomers are those in which two reactive replacement atoms are capable of undergoing nucleophilic replacement in the polymerization process. These monomers are generally represented by the formula: EMe-G-MeE; wherein E- is the reactive replaceable atom, -Me- is the reactive electrophilic group directly attached to the reactive replaceable atom, and -G- is the remainder of the molecule which is called the bridging group. Poly-functional nucleophilic replacement monomers, which are represented by the formula: EMe-G-(MeE)$_t$-MeE; wherein t is the number of EMe groups in excess of 2 (usually in the range of 1–2,000,000) and where EMe- and -G- are defined above. Two particularly important classes of poly-functional nucleophilic replacement monomers are those in which t=1: tri-functional nucleophilic replacement monomers, and t=2: tetra-functional nucleophilic replacement monomers.

Without intentionally limiting the scope of this invention, a few examples of each of the above classes of monomers will be given in order to demonstrate, to a limited extent, how the preferred embodiment of this invention may be described.

Three important classes of addition polymerization monomers are olefins, isocyanates, and isothiocyantes:

Olefins:

Olefinic addition polymerization monomers (OAPM) are very broad in scope; therefore, in order to define the preferred embodiment of this invention without intentionally limiting the scope, only two classes of OAPM will be discussed; 1-substituted ethylenes and 1,1-disubstituted ethylenes. 1-substituted ethylene OAPM may be represented by the general formulas: $CH_2$=CH—R for the mono-functional OAPM; $CH_2$=H-G-CH=$CH_2$ for the bi-functional OAPM; $CH_2$=CH-G-(CH=$CH_2$)—CH=$CH_2$ for the tri-functional OAPM; and, $CH_2$=CH-G-(CH=$CH_2$)$_t$—CH=$CH_2$ for the poly-functional OAPM; wherein —R, -G-, and t are defined above and wherein $CH_2$=CH is the reactive unsaturated group which is specifically the vinyl- or ethylene group.

The mono-functional OAPM, $CH_2$=CH—R, as is well known to those skilled in the art, undergo homopolymerization on exposure to light, on application of heat, or in the presence of certain chemical initiators. On homopolymerization by the latter process in the presence of an initiator Y—R'; wherein Y— is the reactive part of the initiator and —R' is the remainder of the molecule, which is of the same class of substituents as R, $CH_2$=CH—R undergoes polyaddition as shown in equation 31, wherein Y is transformed by the initiation process to form $Y^o$. Alternatively, $CH_2$=CH—R can add to a hydrogen donor monomer or polymer in the presence of a radical, basic or acidic initiator and/or in the presence of light and/or heat as shown in equation 32.

Equation 31:

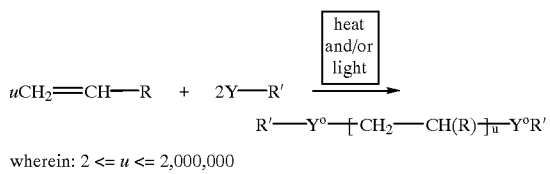

wherein: 2 <= u <= 2,000,000

Equation 32:

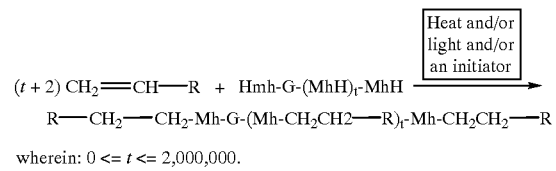

wherein: 0 <= t <= 2,000,000.

Such 1-substituted ethylene OAPM, in a manner not to limit the scope of this invention, are exemplified by the following:

ethylene, propylene, acrylonitrile, acrolein, acryloyl halides, acrylamide and it N-substituted derivatives, acrylic acid and its esters, acrylsulfonic acid and its esters, vinylsulfonamide and its N-substituted derivatives, vinyl halides, vinyl esters, vinyl esters, vinyl ketones, vinyl sulfones, vinyl sulfoxides, vinyl sulfides, vinyl amines, N-vinylamides, vinyl selenieides, vinyl tellurides, vinyl ureas, N-vinylcarbamates, o-vinyl carbamates, styrenes and their nuclear-substituted derivatives, vinyl naphthalenes and their nuclear-substituted derivatives, vinyl pyridines and their nuclear substituted derivatives, vinyl thiophenes and their nuclear substituted derivatives, N-vinyl-2-pyrrolidone, and its nuclear substituted derivatives, nitroethylene, N-vinyl maleinides and their 2 and 2,3-substituted derivatives, N-vinyl phthalimides and their nuclear substituted derivatives, N-vinyl succinimides and the 2 and 2,3 substituted derivatives, N-vinyl glutarimides and the nuclear substituted derivatives, 1-acryloylpiperazines and their nuclear and, particularly, 4-substituted derivatives, 1,4-diacryloylpiperazines, 3-vinylbenzoic acid and its esters and amides, 4-vinylbenzoic acid and its esters and amides, 3-vinylbenzyl ethers, 4-vinylbenzyl ethers, 3 vinylbenzyl esters, 3-vinylbenzyl sulfides, 4-vinylbenzyl sulfides, 3-vinylbenzyl selenides, 4-vinylbenzyl selenides, 3-vinylbenzyl tellurides, 4-vinylbenzyl tellurides, vinyl phosphines, vinyl phosphine oxides, vinyl phosphonic acids and their esters and amides, allyl ketones, ally ether allyl esters, allyl sulfides, allyl selenides, ally tellurides, allyl sulfoxides, allyl sulfones, 1,3-butadiene and other polymerizable 1-substituted ethyenes known to those skilled in the art.

1,1-Disubstituted ethylene OAPM may be represented by the general formulas: $CH_2$=C(R')—R for the mono-functional OAPM, $CH_2$=C(R)-G-C(R)=$CH_2$ for the bi-functional OAPM, $CH_2$=C(R)-G-[—C(R)=$CH_2$—]—C(R)=$CH_2$ for the tri-functional OAPM, and $CH_2$=C(R)-G-[—C(R)=$CH_2$—]$_t$—C(R)=$CH_2$, for the poly-functional OAPM, wherein —R, -G-, and t are defined above, wherein $CH_2$=C— is the reactive unsaturated group (the vinylidene or ethylene group), and —R' is of the same class as —R.

The mono-functional OAPM, $CH_2$=C(R')—R, as is well known to those skilled in the art, undergo homopolymerization on exposure to light, on application of heat or in the presence of certain chemical initiators. On homopolymerization by the latter process as shown above in equation 31 and 32, $CH_2$=C(R')—R undergoes polyaddition as shown in equation 22. Alternatively, $CH_2$=C(R')—R can add to a hydrogen donor monomer or polymer in the presence of a radical, basic or acidic initiator and/or in the presence of light and/or heat as shown in equation 34.

Equation 33:

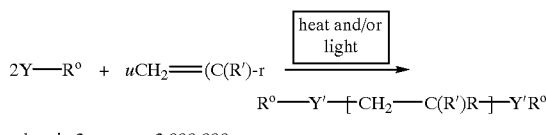

$$2Y\text{—}R^\circ + u CH_2\text{=}(C(R'))\text{-r} \xrightarrow{\text{heat and/or light}} R^\circ\text{—}Y'\text{—}[CH_2\text{—}C(R')R]\text{—}Y'R^\circ$$

wherein $2 \le u \le 2{,}000{,}000$

Equation 34:

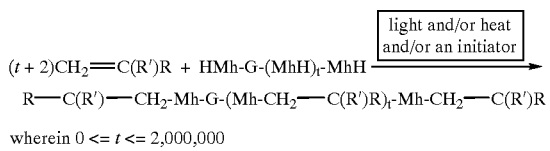

$$(t+2)CH_2\text{=}C(R')R + HMh\text{-}G\text{-}(MhH)_t\text{-}MhH \xrightarrow{\text{light and/or heat and/or an initiator} }$$
$$R\text{—}C(R')\text{—}CH_2\text{-}Mh\text{-}G\text{-}(Mh\text{-}CH_2\text{—}C(R')R)_t\text{-}Mh\text{-}CH_2\text{—}C(R')R$$

wherein $0 \le t \le 2{,}000{,}000$

Such 1,1-disubstituted ethylene OAPM, in a manner not to limit the scope of this invention, are exemplified by the following:

isobutylene, methacrylonitrile, 1-chloroacrylonitrile, 1-aryloxy-acrylonitrile, 1-alkylcarbonylacrylonitrile, 1-arylcarbonylacrylonitrile, 1-alkylsulfonylacrylonitrile, 1-arylsulfonylacrylonitrile, 1-alkylthioacrylonitrile, 1-arylthioacrylonitrile, 1-nitroacrylonitrile, methacrolein, methylacrylamides and its N-substituted derivatives, 1-chloroacrylamides and their N-substituted derivatives, 1-alkoxyacrylamides and their N-substituted derivatives, 1-aryloxyacryloamide and their N-substituted derivatives, 1-alkylcarbonylacrylamides and their N-substituted derivatives, 1-alkylsulfonylacrylamides and their N-substituted derivatives, 1-arylsulfonylacrylamides and their N-substituted derivatives, 1-nitroacrylamides and their N-substituted derivatives, methacrylic acid and its esters, methacryloyl halides, 2-propoanylsulfonic acid and its esters, 2-propenylsulfonamides and its N-substituted derivatives, 2-propenyl ethers, 2-propenyl esters, 2-propenyl ketones, 2-propenyl sulfones, 2-propenyl sulfoxdes, 2-propenyl amines, N-(2-propenyl)amides, 2-propenyl selenides, 2-propenyl tellurides, 2-propenyl ureas, N-(2-propenyl) carbamates, O-(2-propenyl) carbamates 1-methylstyrenes and their nuclear-substituted derivatives, 2-propenyl naphthalenes and their nuclear-substituted derivatives, 2-propenyl pyridines and their nuclear substituted derivatives, 2-propenyl thiophenes and their nuclear-substituted derivatives, 1-methylacryloylpiperazines and their nuclear and, particularly, 4-substituted derivatives, 1,4-dimethacrylonyl piperazine, 3-(2-propenyl)benzoic acid and its esters and amides, 4-(2-propenyl) benzoic acid and its esters and amides, 3-(2-propenyl)-benzyl ethers, 4-(2-propenyl)-benzyl ethers, 3-(2-propenyl)-benzyl esters, 4-(2-propenyl)-benzyl esters, 3-(2-propenyl)-benzyl sulfides 4-(2-propenyl)-benzyl sulfides, 3-(2-propenyl)-benzyl selenides, 4-(2-propenyl)-benzyl selenides, 3-(2-propenyl)-benzyl tellurides, 4-(2-propenyl)-benzyl tellurides, 2-propenyl phosphines, 2-propenyl phosphine oxides, 2-propenylphosphonic acids and their esters and amides, methallyl ketones, methallyl ethers, methallyl esters, methallyl sulfides, methallylselenides, methallyl tellurides, methallyl sulfoxides, methallyl sulfones, isoprene, 2,3-dimethyl-1,3-butadiene, methylenemalonic acid and its esters, halides and amides, methylenemalononitrile, 1-cyanoacrylic acid and its esters, halides and amides, 1-chloroacrylic acid and its esters, halides and amides, 1-methoxyacrylic acid and its esters, halides and amines, 1-nitroacrylic acid and its esters, halides, and amides, 1-(alkylsulfonyl)acrylic acid and its esters, halides and amides, 1-(arylsulfonyl) arylic acid and its esters, halides, and amides, 1-(alkylthio)acrylic acid and its esters, halides, and amides, vinylidene halides, 1,1-diphenylethylene and its nuclear-substituted derivatives and other polymerizable 1,1-disubstituted ethylenes known to those skilled in the art.

As is well know to those skilled in the art, the above classes of ethylenic OAPM; which may be generally represented by the formulas: $CH_2\text{=}C(R')\text{—}R$ and $CH_2\text{=}C(R^3)\text{—}R^2$, wherein $R'$, $R^2$, and $R^3$ have the same definition as R; R and $R^2$ are different and $R'$ or $R^3$ may be independently H; are capable of undergoing successful polymerization in a process wherein individual ethylenic OAPM with differing R-functions are admixed as shown in equation 35. This process is called copolymerization.

Equation 35:

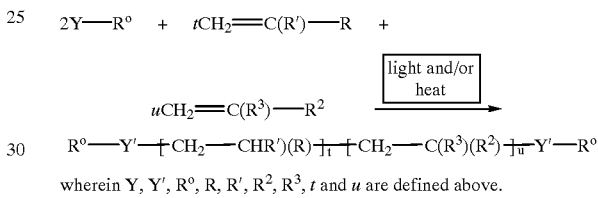

$$2Y\text{—}R^\circ + tCH_2\text{=}C(R')\text{—}R + uCH_2\text{=}C(R^3)\text{—}R^2 \xrightarrow{\text{light and/or heat}}$$
$$R^\circ\text{—}Y'\text{—}[CH_2\text{—}CHR')(R)]_t\text{—}[CH_2\text{—}C(R^3)(R^2)]_u\text{—}Y'\text{—}R^\circ$$

wherein Y, Y', $R^\circ$, R, R', $R^2$, $R^3$, $t$ and $u$ are defined above.

In the copolymerization process of equation 35, the detailed molecular structure of the product polymer, as is well known to those skilled in the art, is dependent on the nature of the R substituents: R, R', $R^2$ and $R^3$. Therefore if the R-set (R',R) is greatly different than ($R^2$, $R^3$) in the manner in which these substituents affect the rate of polymerization of their derived ethylenic OAPM's; $CH_2\text{=}C(R')\text{—}R$ and $CH_2\text{=}C(R^3)\text{—}R^2$; then monomers of the same formula will tend to group together in "blocks" as shown in equation 35. However, if the different sets of R-functions are reflected in ethylenic OAPM's of similar polymerization rates then the resultant copolymer will have a molecular structure wherein the substituents of formulas: —[—$CH_2$—$C(R')(R)$—]— and —[$CH_2C$—$(R^3)(R2)$—]— are randomly distributed along the length of the polymeric product. Furthermore, it is well understood by those skilled in the art, that similar reasoning applies with more than two monomers with respect to the success of the polymerization and the structure of the product polymer. Therefore, in ensuing descriptions the term "copolymerization" is applied to mean two or more monomers contributing to the polymer and polymerization process and the term "copolymer" means two or more monomers contribute to this polymer.

Random and block copolymers with a very broad range of R substituents are within the preferred class of this invention. However, in an effort to simplify and briefly describe the invention without intentionally limiting its scope, specific examples involving the application of ethylenic OAPM's are expressed in terms of 2-substituted ethyl OAPM's of general structure: $CH_2\text{=}CH\text{-}G\text{-}CH_2CH_2\text{—}R$ wherein, in examples involving copolymerization, the -G- groups are the same but the R groups defined above may be different. This class of OAPM incidentally gives random copolymers in most polymerization processes as is well known to those skilled in the art. In ensuing discussions the -G- group is generally referred to as "the bridging group" and the R-group as "the functional group". In representation of these polymers the subscripts t, u, v, and w indication the degree of polymerization is punctuated with an asterisk (*) as t*, u*, v*, and w* to denote that the distribution of indicated polymer substituents is approximately random. Therefore, polymerization resulting in copolymers derived from 2, 3, and 4 different monomers may be represented as in equations 36, 37, and 38 respectively. The homopolymer is similarly represented in equation 39.

Equation 36:

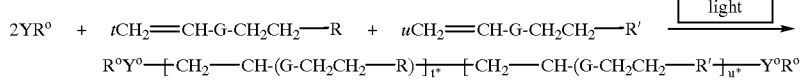

Equation 37:

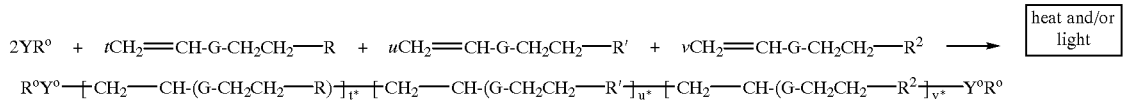

Equation 38:

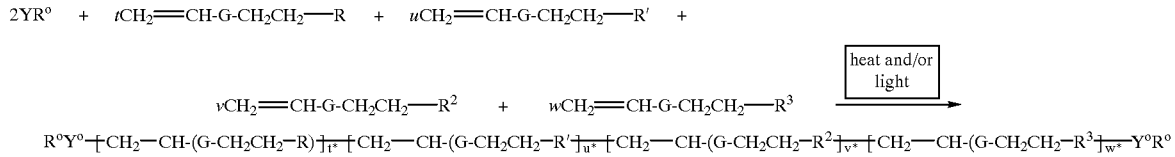

Equation 39:

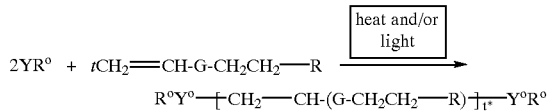

It is well known to those skilled in the art, that by variation of monomer ratios, that is, the values of t, u, v, and w, the nature or amount of the initiator, Y—R⁰; or the time, temperature, light wavelength and/or intensity result in the formation of polymers of differing molecular weight and therefore differing physical properties. One such physical property is viscosity, wherein the viscosity may range from limp oils, to think oils, to soft semisolids, to tacky semisolids, to ridge semisoilds, to hard solids. Similarly, it is understood that the interaction of the polymer with external surfaces can be varied by variation of the nature of the R-groups. Such properties involve the physical state, adhesion of the polymer to the surface, and diffusion of fluids from the surface into and from the polymer.

It is well known to those skilled in the art, that hydrophilic —R functional groups effect diffusion of water, aqueous solutions and human and animal bodily fluids to flow and/or diffuse. Such end-product homopolymers or copolymers could be formed from hydrophilic —R group as exemplified in equations 36 to 39 inclusive. These hydrophilic —R groups would include:

hydroxy, hydroxymethyl, 1-hydroxyethyl, 2-hydroxyethyl, 2-hydroxyethoxy, 2-hydroxy-1-propoxy, 3-hydroxy-1-propoxy, 1-hydroxy-2-propoxy, 2-(2-hydroxyethoxy)-ethoxy, 2-(2-hydroxy-1-propoxy)-ethoxy, 2-(2-hydroxy-1-propoxy)-ethoxy, 2-(1-hydroxy-2-propoxy)-ethoxy, 2-[2-(2-hydroxyethoxy)-ethoxy]-ethoxy, carboxy, carboxymethyl, 1-carboxyethyl, 2-carboxyethyl, 2-carboxyethoxy, 2-carboxy-1-propoxy, 3-carboxy-1-propoxy, 1-carboxy-2-proxy, 2-(2-carboxyethoxy-ethoxy, 2-(2-carboxy-1-propoxy)-ethoxy, 2-(3-carboxy-1-propoxy)-ethoxy, 2-(1-carboxy-2-propoxy)-ethoxy, 2-[2-(2-carboxyethoxy)-ethoxy]-ethoxy.

In addition, these hydrophilic —R function groups are groups which promote adhesion of the polymer to human or animal skin.

It is well known to those skilled in the art, that there exists a broad range of —R functional groups, which are compatible with polymerization processes and with the hydroxylic and carboxylic functional groups described above, which are readily nucleophilically displaced in nucleophilic replacement reactions. Such —R groups may be incorporated into such end-product homopolymer or copolymers as, for example, the —R', R², and/or R³ groups in equations 36 to 38 inclusive, or the R- group in equation 39 would include:

chloro, bromo, iodo, methanesulfonyloxy, benzenesulfonyloxy, p-toluenesulfonyloxy, chloromethyl, bromomethyl, iodomethyl, methanesulfonyloxy methyl, benzenesulfonyloxy methyl, p-toluenesulfonyloxy methyl, 2-chloroethoxy, 2-bromoethoxy, 2-iodoethoxy, 2-(methanesulfonyloxy)-ethoxy, 2-(benzenesulfonyloxy)-ethoxy, 2-(p-toluenesulfonyloxy)-ethoxy, 2-(2-chloroethoxy) ethoxy, 2-(2-bromoethoxy)-ethoxy, 2-(2-iodoethoxy0-ethoxy, 2-[2-(methanesulfonyloxy)]-ethoxy, 2-[[2-(benzenesulfonyloxy)]-ethoxy, 2-[2-(p-toluenesulfonyoxy)]-ethoxy.

The above groups are therefore all terminally substituted with an -E nucleophilically displaceable group defined above.

It is well known to those skilled in the art, that there exists a broad range of hydrophobic —R functional groups, which are compatible with polymerization processes and with the hydroxylic, carboxylic, and nucleophilically displaceable functions described above, Such hydrophobic —R groups are known to be capable of regulating the adhesion to animal or human tissue which is known to exhibit a balance of hydrophobic and hydrophilic character wherein these —R group mimic the hydrophobic character. These hydrophobic groups include:

hydrogen, methyl, ethyl, 1 or 2-propyl, 1 or 2 butyl, 1, 2 or 3-pentyl, 1, 2 or 3-hexyl, 1,2,3 or 4 heptyl, 1-octyl, 1-nonyl, 1-decyl, 1-undecyl, 1-dodecyl, 1-tridecyl, 1-tetradecyl, 1-pentadecyl, 1-hexadecyl, 1-heptadecyl, 1-octadecyl, 1-nonadecyl, 1-cosyl, methoxy, ethoxy, 1 or 2-propoxy, 1-butoxy, 1-pentyloxy, 1-hexyloxy, 1-heptyloxy, 1-octyloxy, 1-nonyloxy, 1-decyloxy, 1-undecyloxy, 1-dodecyloxy, 1-tridecyloxy, 2-ethyl-1-hexyloxy, 1-tetradecyloxy, 1-pentadecyloxy, 1-hexadecyloxy, 1-heptadecyloxy, 1-octadecyloxy, 1-nonadecyloxy, 1-cosyloxy, phenyl, benzyl, 2-phenethyl, 1-phenethyl, phenoxy, 2-methylphenoxy, 3-methylphenoxy, 4-methylphenoxy, 2-ethylphenoxy, 3-ethylphenoxy, 4-ethylphenoxy, 2-methylphenoxy, 3-methoxyphenoxy, 3-methoxyphenoxy, benzyloxy, 2-phenethyloxy, 1-phenethyloxy, 2, 3 or 4-tolyl.

These hydrophobic —R groups may be incorporated into end-product homopolymers or copolymers as, for example, the —$R^2$ and/or $R^3$ groups in equation 36 to 38 inclusive or the —R group in equation 39.

It is clear to those skilled in the art that, by the copolymerization process of equation 36, that a copolymer which embodies both a nucleophilically displaceable function, for —R, and a hydrophilic group, for —R', can be made. Similarly that, by the copolymerization process of equation 37, that a copolymer which embodies a nucleophilically displaceable group, for —R, a hydrophilic group, for —R', and a hydrophobic group, for —$R^2$, can be made. Also it is similarly clear that by the copolymerization process of equation 38, that a copolymer which embodies a nucleophilically displaceable group, for —R, a hydrophilic group for —R', a hydrophobic group, for $R^2$, and an additional group for —$R^3$, which may be either hydrophilic or hydrophobic. Each of these three types of polymers embodies a hydrophilic group and nucleophilically displaceable group. Therefore, each may be represented by the formula: Pol-E wherein -E is the nucleophilically displaceable group and Pol- is the hydrophilic polymer. This simple polyfunctional polymer, readily understood within the current state of the art, can be utilized within the preferred embodiment of this invention, to make novel environmental-sensing 3H-fluoren-3-ylidene based materials for bimedical determinations on and under human or animal skin.

A novel polymeric analogue of 3H-fluoren-3-ylidene functionalized glucose sensor molecule made in equation 29 is made, in a non-limiting example, by nucleophilic displacement of the E-group of Pol-E by a 3H-fluoren-3-ylidene functionalized glucose sensor nucleophile. This novel nucleophile is made by a two-step process.

The first step of this process, in a direct analogy to equation 26, is the derivativization of Concanavalin A (HCon) with iodoacetyl chloride to produce iodoacetyl-Concanavalin A [$ICH_2C(O)$-Con] as shown in equation 40. This process is one of a type well known to those skilled in the art.

Equation 40:

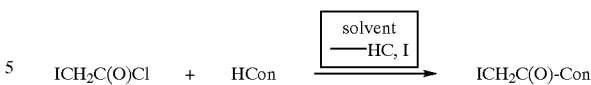

The second step of this process, in direct analogy to equation 11, is the reaction of the novel 3H-fluoren-3-ylidene bifunctional nucleophile of formula: E*O-Fl-OE*, which directly corresponds to the product of equation 10 wherein r=2, with a single equivalent of the product of equation 40 to give the novel 3H-fluoren-3-ylidene functionalized glucose sensor nucleophile, of formula: E*O-Fl-$OCH_2C(O)$-Con, as shown in equation 41.

Equation 41:

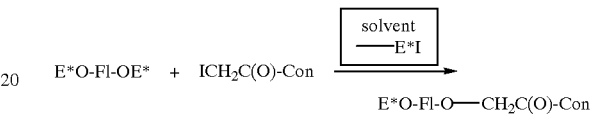

The novel polymeric 3H-fluoren-3-ylidene functionalized glucose sensor molecule, of formula: Pol—O—Fl-$OCH_2C$(O)-Con, as shown in equation 42, by the reaction, under conditions well known to those skilled in the art, of one equivalent (relative to the E-group) of Pol-E with one equivalent of the novel 3H-fluoren-3-ylidene functionalized glucose sensor nucleophile product of equation 41.

Equation 42:

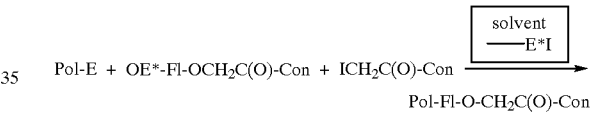

While the novel polymeric 3H-fluoren-3-ylidene functionalized glucose sensor molecule produced in equation 42 may be applied in glucose determination and monitoring, when applied to the surface of the skin, a novel derivative analogue applicable to the well established FRET technique can be made. This is accomplished by a direct analogy to the process of equation 29 by derivatization of the novel polymeric product of equation 42 with the well known quencher-substituted dextran molecule, of formula: Dx-Fq, by reaction of equivalent quantities of these materials as shown in equation 43, to form the novel polymeric 3H-fluoren-3-ylidene functionalized glucose sensor molecule for FRET applications of formula: Pol-O-Fl-O—$CH_2C$(O)-Con←Dx-Fq.

Equation 43:

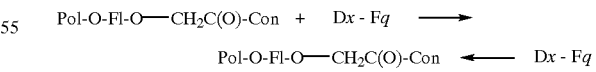

The novel glucose-sensor materials generated in equations 42 and 43 are linear polymers which can be fabricated in a form of an adhesive which will adhere to the skin for applications as super-dermal (above skin) glucose sensor. For application beneath the surface of the skin, that is, a sub-dermal (below-skin) sensor a more rigid polymeric material might be desirable.

Whereas for super-dermal applications a more polar and biodegendable -G- groups, such as: —C(O)O— or —C(O)

N(R)— or —O—, might be utilized in the structure of the Pol-substituent, sub-dermal applications might be better achieved with more biostable -G- groups, such as:

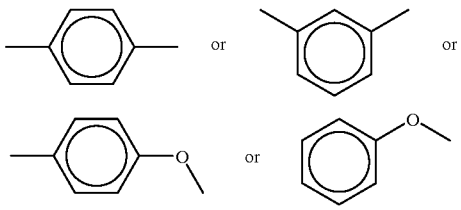

With the latter groups the sub-dermal implant will be of longer half-life beneath the surface of the skin.

Another method of producing sub-dermal materials well known to those skilled in the art, is the production of a more rigid, insoluble polymer by the cross-linking method. Therefore a cross-linked analogue of the copolymer produced in equation 38 could be made by substitution of the fourth monomer, of formula: $CH_2=CH\text{-}G\text{-}CH_2CH_2\text{—}R^3$, with a polyfunctional ethylenic OAPM such as a bifunctional ethylenic OAPM, of formula: $CH_2=CH\text{-}G\text{-}B'g\text{-}G\text{-}CH=CH_2$; or a trifunctional ethylenic OAPM, of formula: $CH_2=CH\text{-}G\text{-}B^2g\text{-}(-G\text{-}CH=CH_2\text{—})\text{-}G\text{-}CH=CH_2$; or a tetrafunctional ethylenic OAPM of the formula: $CH_2=CH\text{-}G\text{-}B^3g\text{-}(-G\text{-}CH=CH_2\text{—})_2\text{-}G\text{-}CH=CH_2$; or a generalized polyfunctional ethylenic OAPM of formula: $CH_2=CH\text{-}G\text{-}B^ng\text{-}(-G\text{-}CH=CH_2\text{—})_n\text{-}G\text{-}CH=CH_2$; wherein n is greater than 2 but less than 2,000,000. For the sake of simplicity, since the design of such multifunctional monomers is well understood by those skilled in the art, the nature of the bifunctional and trifunctional varieties will be defined.

The bifunctional ethylenic OAPM of formula: $CH_2=CH\text{-}G\text{-}B'g\text{-}G\text{-}CH=CH_2$, wherein the nature of -G- has been defined above can be clearly and completely defined by detailed specification of the nature of the -B'g- group. Examples of -B'g- groups, without intentionally limiting the scope of this invention include:

methylene; 1,1- and 1,2-ethylidene; 1,1-, 1,2-, and 1,3- propylidene; 1,1-, 1,2-, 1,3-, and 1,4-butylidene; 1,1-, 1,2-,1,3-, 1,4- and 1,5-pentylidene; 1,1-,1,2-, 1,3-, 1,5- and 1,6-hexylidene; 1,7-heptylidene; 1,8-octylidene; 1,9-nonylidene; 1,10-decylidene, 1,11-undecylidene; 1,12-dodecylidene; 1,13-tridecylidene; 1,14-tetradecylidene; 1,15-pentadecylidene; 1,16-hexadecylidene; 1,17-heptadecylidene; 1,18-octadecylidene; 1,19-nondecylidene; 1,20-cosylidene; 1,21-eicosylidene; 1,22-docosylidene; oxydimethylene; 2,2'oxydiethylene; 3,3'-oxydi(1-propylene0; 1,2-bis(2-oxyethylene)-ethylene; oxy-bis[2-(2-ethyleneoxy)ethylene]; 1,2- bis[2-(2-ethyleneoxy)ethylene]-ethylene; N-methyl-N,N-dimethyleneamino; 1,4-phenylene; N-methyl-N,N-di(1,2-ethylene)amino; 1,3-phenylene; N-methyl-N,N-di(1,3-propylene) amino; 1,4'-tolylidene; 1,3'-toylidene; 1,1'-(p-xylidene0; 1,1'-(m-xylidene); 2,4'-phenethylene; 2,3'-phenethylene; 4'-methylene-2-phenethyl; 3'-methylene-2-phenethyl; 2,2'-(1,4-phenylene) diethylene; 1,4-biphenylene; 2,2'-(1,3-phenylene)-diethylene; 1,3-bibiphenylene; oxybis(1,4-phenylene); oxybis(1,3-phenylene); N-methyl-N,N-bis(1,4-phenylene)amino; N-methyl-N, N-bis(1,3-phenylene) amino; thiobis(1,3-phenylene); thiobis(1,4-phenylene); thiodimethylene; 2,2'-thiodiethylene; 3,3'-thiodi(1-propylenes; 4,4'-oxybis(benzyl); 3,3'-oxybis(benzyl) 1,3-maphthylidene; 1,5-haphthylidene, 1,6-naphthylidene; 2,6-naphthylidene, 2,7-naphthylidene; and other bifunctional bridging groups well known to those skilled in the art.

The trifunctional ethylenic OAPM of formula: $CH_2=CH\text{-}G\text{-}B^2g\text{-}(-G\text{-}CH=CH_2\text{—})\text{-}G\text{-}CH=CH_2$, wherein the nature of -G- defined above, can be clearly and completely defined by detailed specification of the nature of the -B²g= group. Examples of -B²g= groups, without intentionally limiting the scope of this invention include:

methylidyne; 1,1,1- and 1,1,2-ethylidyne; 1,1,1-, 1,1,2-, 1,2,2-, and 1,2,3-propylidyne; 1,1,1-, 1,1,2-, 1,1,3-, 1,2,2-, 1,2,3-, 1,2,4- 1,3,3- 1,2,4- and 1,4,4-butylidyne; 1,2,3-,1,2,4-,1,2,5-, and 1,3,5-, pentylidyne; 1,2,4-,1,3, 5-, 1,3,6-, and 1,2,6-hexylidyne; 2-methylene-1,3-propylidene; 2-methylene-1,4-butylidene; 3-methylene-1,5-pentylidene; 3-(2-ethylene-1,5-pentylidene; 2-metheneoxy-1,3-propylidene; 2-methyleneoxy-1,4-butylidene; 3-metheneoxy-1,5-pentylidene; 3-(2-ethyleneoxy)-1,5-pentylidene; dimethyleneoxymethyl; 1,3-dimethoyleneoxy-2-propyl; 1,5-dimethyleneoxy-3-pentyl; bis(2-ethyleneoxy) methyl; 1,3-bis(2-ethyleneoxy)-2-propyl; 1,5-bis(2-ethyleneoxy)-3-pentyl; 1,2,3-tris(2-ethyleneoxy)-propane; 1,3,5-benzenetriyl; 1,3,5-tris(2-ethyleneoxy)-pentane; 3,5-dimethylene-phenyl; 1,4,7-tris(2-ethyleneoxy)-heptane; 5-methylene-1,3-phenylene; 1,2,5-tris(2-ethyleneoxy)-pentane; 1,3,5-trimethylenebenzene; 1,2,3-tris(2-ethyleneoxy)-pentane; 1,3,5-tris(methyleneoxy)benzene; 5-methyleneoxy-1,3-phenylene; 3,5-bis(methyleneoxy)phenyl; 5-(2-ethyleneoxy)-1,3-phenylene; 3,5-bis(2-ethyleneoxy)-phenyl; 1,3,5-tris (2-ethyleneoxy)benzene; and other trifunctional bridging groups well known to those skilled in the art.

Therefore, while the linear polymers produced by equations 36 through 39 inclusive may, in certain classes have very limited lifetimes in a sub-dermal environment, cross-linked polymers derived from copolymerization of polyfunctional monomers possessing -B'g-, -B²g-, -B³g-, up to -B"g- bridging groups will be dimensionally more rigid and possess much longer sub-dermal lives.

Examples of the application of this well-know cross-linking technology to create more 3H-fluorene-3-ylidene sub-dermal glucose sensor materials involve the reaction of a novel 3H-fluoren-3-ylidene functionalized glucose sensor nucleophile with the appropriate cross-linked polymer substituted with nucleophilically displaceable, hydrophilic, and optionally hydrophobic groups. Therefore, equation 44 wherein further polymerization occurs as the crosslink, -CK, attached to Bg, which is equivalent to equation 38 wherein the fourth monomer is substituted by the bifunctional ethylenic crosslinking monomer of formula:

Equation 44:

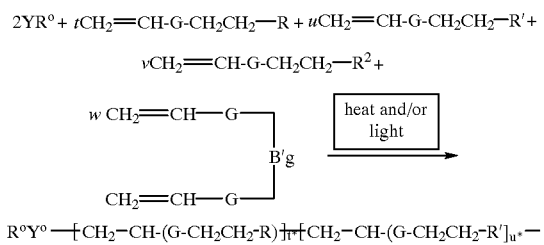

-continued

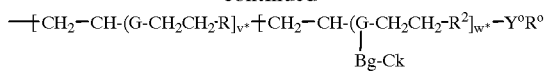

produces a crosslinked polymeric intermediate of a type well known to those skilled in the art.

Similarly, equation 45 wherein further polymerization occurs as the two crosslinks, —$CK_2$, attached to Bg, produces a similar polymeric intermediate in a process equivalent to equation 38, wherein the fourth monomer is substituted by the trifunctional ethylenic crosslinking monomer of formula Equation 45:

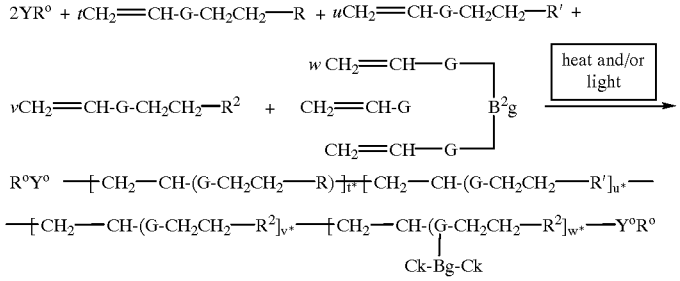

well known to those skilled in the art.

The two type of polymers produced by the process of equations 44 and 45 both embody a crosslinked structure, hydrophobic groups, hydrophilic groups, and nucleophilically displaceable groups. Therefore both may be represented by the formula: Pol*-E wherein -E is the nucleophilically replaceable group and Pol* is the crosslinked polymer having both hydrophilic and hydrophobic substituents. This simple crosslinked polyfunctional polymer, readily understood within the preferred embodiment of this invention, to make novel environmentally sensing 3H-fluoren-3-ylidene based materials for biomedical determinations on and under human and animal skin. Moreover, due to the higher dimensional stability and slower biodegradability expected of crosslinked polymers, such materials are likely to exhibit superior properties in sub-dermal environments than the linear polymeric analogues described above.

In a number directly analogous to that applied to linear polymeric analogues described in equation 42, the crosslinked polymer Pol*-E is expected to undergo nucleophilic displacement of the -E functions by interaction with equivalent quantities, relative to the -E group, of the 3H-fluoren-3-ylidene functionalized glucose sensor nucleophile of formula: E*O-Fl-O$CH_2$C(O)-Con, made by the process of equation 41, as shown in equation 46, to produce the crosslinked 3H-fluoren-3-ylidene functionalized glucose sensor material of formula: Pol*-O-Fl-O—$CH_2$C(O)-Con. This material should be useful as a material for determination and/or monitoring glucose levels, in analogy to the prior art, by virtue of the ability of the -Con function to reversibly bind glucose, Gl, as shown in the equilibrium equation of equation 47 to form the glucose-ligated analogue: Pol*-O-Fl-O—$CH_2$C(O)-Con←Gl. This latter analogue should differ somewhat in its optical emission, absorption and/or refraction compared to the uncomplexed analogue: Pol*-O-Fl-O—$CH_2$C(O)-Con. Therefore the levels of glucose in the surrounding environment may be determined and/or monitored by instrumentation appropriate to the measurement of their optical properties by comparison with a calibration curve determined from similar systems containing known glucose levels.

Equation 46:

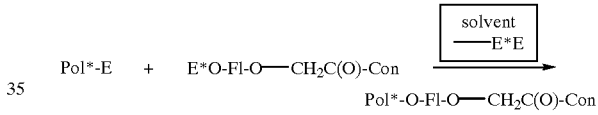

Equation 47:

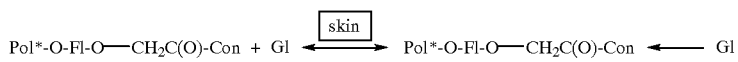

Alternatively, as described above concerning the FRET technique, the product of equation 46 can be similarly functionalized, as shown in equation 48, with the Dx-Fq group to produce the 3H-fluoren-3-ylidene functionalized crosslinked polymeric glucose sensing material for FRET applications of formula: Pol*-O-Fl-O—$CH_2$C(O)-Con←Dx-Fq.

Equation 48:

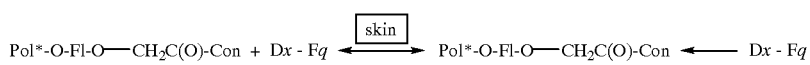

The product dextran functionalized complex, Pol*-O-Fl-O—$CH_2$C(O)-Con←DxFq, may by analogy with known art, be employed as a glucose sensor material by virtue of its interaction with glucose to reversibly generate the glucose complex: Pol*-O-Fl-O—$CH_2$C(O)-Con←Gl in the presence of tissue glucose as shown in equation 49. In analogy with known art, selection of an appropriate quencher function -Fq, will result in a particularly sensitive tissue-glucose sensor system bound on the greatly different luminescence emission intensity, phase angle and/or lifetime of the complex of equation 49 wherein: Pol*-O-Fl-O—CH$_2$C(O)-Con←Dx-Fq, is the 3H-fluoren-3-ylidene functionalized crosslinked polymeric glucose sensor material.

Equation 49:

The polyfunctional ethylenic OAPM described above may, as is well known to those skilled in the art, be applied as monomers in polymerization processes wherein the ethylenic functions are involved in addition polymerizations in reactions with polyfunctional hydrogen donor monomers or polymers. To simply illustrate this concept, the copolymerization of a bifunctional ethylenic OAPM and a bifunctional hydrogen donor monomer is shown in equation 50. Clearly trifunctional or higher polyfunctional monomers will generate analogous crosslinked polymers.

Equation 50:

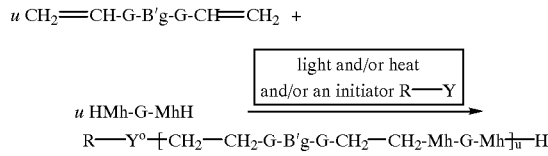

Another important class of addition polymerization monomers are those in which the carbon to nitrogen double bound or imine group is subject to the addition process. Such imine addition polymerization monomers (IAPM) are very broad in scope. In order to define the preferred embodiment of this invention without intentionally limiting the scope of this invention, only two classes of IAPM will be discussed: isocyanates, those with the —N=C=O function, and isothiocyanates, those with the —N=C=S function. Since both of these functions have directly analogous polymerization chemistry, they will be described by the general formula —N=C=Z, where Z=O or S, and described generally as imines or imine monomers or IAPM.

IAPM are applied in copolymerization technology in conjunction with hydrogen donor monomers (HDM) in a manner analogous to equation 50. Therefore, generally IAPM are polyfunctional, that is, bifunctional or having greater functionality. To simply illustrate this process, the copolymerization of a bifunctional IAPM with a bifunctional HDM is shown in equation 51. Clearly trifunctional or higher polyfunctional monomers will generate crosslinked polymers.

Equation 51:

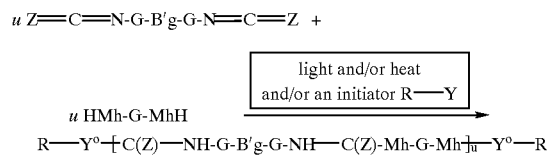

In a manner described above extensively with ethylenic OAPM-functionalized copolymers may be made of both a linear and crosslinked nature which can be broadly functionalized with 3H-fluoren-3-ylidene functions appropriate to a broad range of applications, such as, the glucose sensor materials discussed extensively above. Such functionalization can be effected by employing monomers and polymers with -B$^2$g-, -B$^3$g-, and -B"g- bridging functions into which are substituted appropriate and similar functions which are subjected to directly analogous functionalization processes.

Examples of specific hydrogen donor monomers (HDM) of general formula: HMh-G-B"g-(-G-MhH-)$_n$-MhH are those in which -Mh- is:

—O—; —S—; —Se—; —Te—; —NH—; —N(R)—; —PH—; —P(R)—; —OC(O)—; —SC(O)—; —OC(S)—; —SC(S)—; —CH(R)—; —C(R)(R')—; and other groups well known to those skilled in the art.

While HDM may be applied in copolymerization processes in conjunction with OAPM and IAPM comonomers, they may also be applied, as is well known to those skilled in the art, with nucleophilic replacement monomers described below. Nucleophilic replacement monomers (NRM) of general formula: EME-G-B"g-(-G-MeE-)$_n$-MeE are exemplified by those in which E-Me- is:

E-C(O)—; E-C(S)—; E-C(Se)—; E-C(Te); E-C(NH)—; E-C(NR)—; E-CH$_2$—; E-CH(R)—; E-C(R)(R')—; E-S(O)—; E-S(O)$_2$—; E-S(NH)—; E-S(NR)—; E-S(NH)$_2$—; E-S(NR)$_2$—; E—Ph(O)—; E—P(R)(O)—; and other E-ME- groups well known to those skilled in the art.

As is well known to those skilled in the art, a very broad range of polymers may be made by copolymerizations between HDM and NRM, a reaction which may be generally exemplified by equation 52. To simply illustrate this process, a bifunctional HDM and/or bifunctional NRM are applied. Clearly trifunctional or higher polyfunctional monomers will generate analogous crosslinked polymers.

Equation 52:

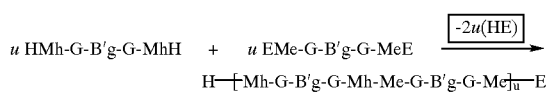

In a manner described above extensively with ethylenic OAPM, functionalized copolymers may be made of both a linear and crosslinked nature which can be broadly functionalized with 3H-fluoren-3-ylidene functions appropriate to a broad range of applications, such as, the glucose sensor materials discussed extensively above. Such functionalization can be effected employing monomers and polymers with -B$^2$g-, -B$^3$g-, and -B"g- bridging functions into which are substituted appropriate and similar functions which are subject to directly analogous functionalization processes.

Electrooptical Materials: Detailed Description and Synthetic Processes

In order to most efficiently utilize and exploit the maximum potential of computer, telecommunications, educational, entertainment, defense, and sensor systems the highest possible rate of information transfer must be achieved. The information transfer rate, which is give in terms of frequency in units of cycles per second or Hz is a measure of the quality of these systems. For frequencies in the excess of 0.5 GHz information is most efficiently carried by fiber optic cable as pulses of light. This is due to the fact that transmission of such electrical signals through electrical cables occurs with considerable loss of energy due to conversion of signal power to heat due to the property of parasitic capacitance; however, optical signal do not exhibit these limitations. Therefore, materials capable of the production of manipulation and modulation of light, electrooptical (EO) materials, are needed. Currently multi-component semiconductor EO materials are utilized to produce frequencies up to the limit of the ultrahigh frequency (UHF) range of 3 GHz. These materials, due to the necessary exactness of the ratio of components and their crystalline quantity are difficult to produce at high volume. In addition many of these materials are arsenic-based, such as, GaAs and InGaAsP and; therefore, have a potential for a negative environmental impact. An alternative technology based on ionic, insulating crystals, such as, lithium niobate (LiNbO3), is similarly deficient. Progress beyond this limit, in the extremely high frequency (EHF) range of 3 GHZ to 3 THz is along similar directions.

Among electronic materials, and contrary to the difficulties of semiconductor and insulating crystal materials, great progress has been achieved in the area of photolithography. Photolithography is a very efficient and high speed technology for the production of tightly integrated systems, such as, electrical integrated circuits.

Photolithography is effected in three steps: coating, irradiation and etching. The coating step involves deposition on a metal surface of a monomeric and/or polymeric coating in a manner resembling printing. The irradiation step involves exposure of well defined regions of the coating with electromagnetic radiation usually in the ultraviolet or visible range. These steps are usually very fast, efficient and of benign environmental impact. The final step etches away or removes select regions of the exposed coating by exposure to chemical developer baths. This latter step is slow and creates considerable effluent with negative environmental impact.

Currently improved technology is available for the similar production of organic optical integrated circuits (OIC) by photoprocessing. This methodology involves similar organic coating and irradiation steps, which are conducted in the presence of an electric field (poling). However, the environmentally poisonous etching step is not required. These materials operate in the EHF range and closely approach the efficiency of inorganic systems with a potential of far exceeding their range of efficacy and application. Therefore, invention and exploitation of improved organic materials (EHF organic EO materials) for OIC production will be very useful and have a benign environmental impact. A broad range of current EHF organic EO materials are based on the use of highly electrically polarizable organic compounds which share the frontier molecular orbital of stilbene (structure B) and its heterocyclic (ex.: thiophene for benzene rings) and azo (nitrogen to nitrogen double bound connecting benzene rings) analogues wherein the large dots (●) are substituents.

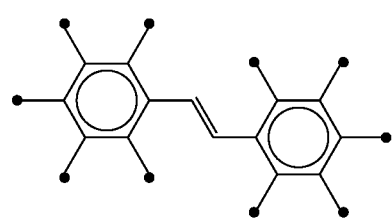

These compounds apparently owe their efficacy to their high electric polarizability, first and second order hyperpolariability (hereafter simply: "polarizabilty") which permits them to generate very rapidly materially equivalent electrically polarized higher energy analogues, in the presence of an applied external electric field, which have much greater contributions of the polarized canonical structure B'. Increasing B' character results in variable light absorption and indices of refraction which will permit modulation and manipulation of light by taking advantage of the resultant variations in the birefringence retardation and/or absorption of the overall material.

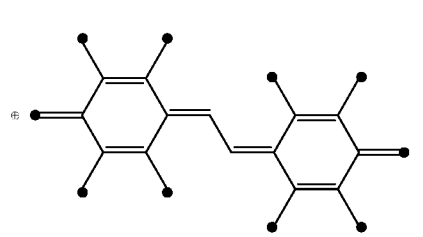

Two major problems exist which limit the performance of these stilbene-based EO organic materials. The first being that these desired properties of electrical polarizability are optimal only in the actual conformation of these molecules wherein the benzene rings and their connective bonds lie in the same geometrical plane. At ordinary temperature in materials produced by conventional procedures, these molecules exist in a broad range of conformations many of which deviate considerably from coplanarity, thereby greatly limiting the potential EO performance of the overall material. Another major problem is that the polarizability of the B-type molecule to produce the B'-type molecule is energetically very difficult due to the loss of the aromaticity of tow rings in B to produce B'.

The first problem, deviation from planarity, might be solved in both of the rings by the use of on appropriately substituted 9-H fluorene analogue C wherein the bridging methylene linkage of the 9-carbon enforces coplanarilty. This approach is encouraged by the ready availability to produce, by well established chemical technology, of the necessary 2,7-disubstitued-9H-fluorenes required for optimization of polarizabilty. However, the second problem, dual loss of aromaticity in both of the benzene rings is serious due to the high energy antiaromatic state of C:

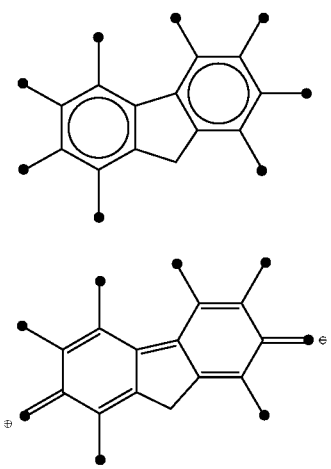

C

C'

In order to create a solution designed to overcome both of these problems, the new types of frontier molecular orbitals of 3H-fluoren-3-ylidenes, which are both coplaner and equivalently aromatic and antiaromatic in both low (A) and high energy (A) polarized states, are invented herein.

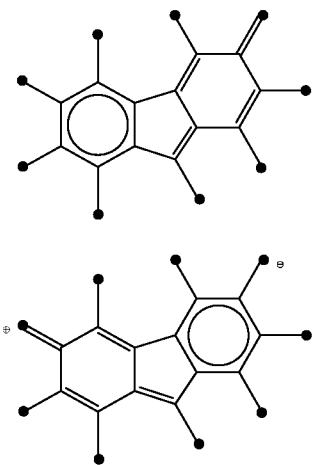

A

A'

In addition, since no art has been readily available for making these novel 3H-fluoren-3-ylidenes, novel process chemistry and novel intermediates for producing them is invented herein. This chemistry permits production of such 3H-fluoren-3-ylidenes which possess the very broad range of substituents essential to the generation of monomers and polymers to permit application of current, established processes for the production of stable and effective organic EO materials and OIC's examples of which are presented below. In addition, limited examples of useful devices based on the resultant materials and OIC's are given below.

In the detailed description of this invention entitled: The Preferred Embodiment of the Invention: Detailed Description of Compounds, those 3H-fluoren-3-ylidene functionalized intermediates and monomers necessary for the fabrication of organic EO materials, OIC devices and systems was fully described. In the third part of the detailed description of this invention entitled: The Preferred Embodiment of the Invention: Detailed Descriptions of Synthetic Processes for Compounds, methods for making these intermediates and monomers employing conventional chemical technology was fully described. In this section, a detailed description of synthetic processes for the derived 3H-fluoren-3-ylidene based materials for organic EO applications are described in detail.

Organic crystals, liquid crystals, or polymers are the preferred embodiment for that nature of the material matrix for novel 3H-fluoren-3-ylidene based materials. Within this class crosslinked organic polymers are the highly preferred embodiment. For simplicity, without intentionally limiting the scope of this invention, one class of each type are described in detail: linear organic polymers and crosslinked organic polymers.

As previously described, those substituted 3H-fluoren-3-ylidenes which readily undergo electrical polarization; as reflected in those 3H-fluoren-3-ylidenes wherein polarized canonical structures, such as A, 1D or 1A (above) make an important contribution to the overall frontier molecular orbital, as induced by appropriate substitution of electron donor and/or electron acceptor groups in the 3 and/or 6 positions, as indicated in the canonical molecular structures 1A-a, 1A-b, 1D-a, 1D-b, 2A-a, 2A-b, 2D-a, and 2D-b (above) are preferred within the framework of this invention. Most highly preferred materials are those wherein the electric vector of the polarized canonical structures are similarly or oppositely aligned relative to the orientation of the applied exterior electric field of the resultant device or system. To achieve this preferred mode of orientation the process of polymerization used to produce the polymeric material from the monomer is conducted in the presence of an applied electric field of direction and magnitude necessary to induce such orientation of the 3H-fluoren-3-ylidene sites. This process is called poling. A single class of 3H-fluoren-3-ylidene functionalized monomers, without intentionally limiting the scope of this invention, the 1-substituted ethylenic OAPM and a single class of linear and crosslinked functional polymers derived from these monomers will be described.

The preferred classes of 3H-fluoren-3-ylidene functionalized 1-substituted ethylenic OAPM and their synthesis have previously been described; therefore, without intentionally limiting the scope of this invention, only one specific type in which the polymerizable function group is 2-oxyethylacrylate, of formula: $-OCH_2CH_2OC(O)CH=CH_2$ or $CH_2=CHC(O)OCH_2CH_2O-$ is described. Furthermore, without intentionally limiting the scope of this invention, only linear and crosslinked polymers is described.

Classes of 3H-fluoren-3-ylidene 1-substituted ethylenic OAPM with 2-oxyethylacrylate substituents are synthesized by reactions of the 3H-fluoren-3-ylidene functionalized nucleophiles of general formula: $Fl-(OE^*_{1/s})_r$, made by the process of equations 9 and 10 and represented below as the dianionic nucleophile: $(\ominus O)_x-Fl-(O\ominus)_y$ wherein: $x+y=r$. This nucleophile is reacted in a manner depicted in equation 14 with a 2-(functionalized)-ethyl acrylate of formulas: $E-CH_2CH_2OC(O)CH=CH_2$ or $CH_2=CHC(O)OCH_2CH_2-E$, wherein E- is a nucleophilic replaceable radical defined above. A specific example of this type of intermediate is 2-chloroethyl acrylate: $Cl-CH_2CH_2OC(O)CH=CH_2$, a typical monomer, therefore, a typical 3H-fluoren-3-ylidene 1-substituted OAPM, without intentionally limiting the scope of this invention, is made by the process of equation 53.

Equation 53:

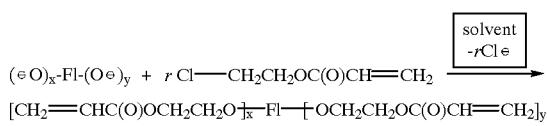

In a similar manner, a monomer incorporating an initiator Y which may be made by reacting an intermediate of formula E-Y, wherein E- is a nucleophically replaceable radical, and -Y is an initiator radical defined above may be made in equation 54.

Equation 54:

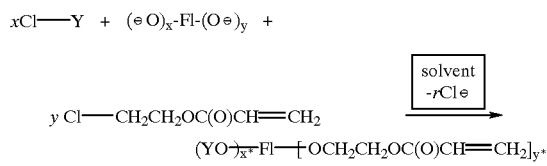

wherein x and y are depicted as X* and y* to denote the randomization of their related functions.

In a manner generally depicted in equations 31 and 39, utilizing the product of the process of equation 53, wherein x=o and y=1, polymers may be made by the process of equation 55.

Equation 55:

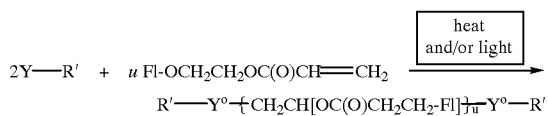

Similar applications of the process of equation 55, utilizing the monomer made in equation 54, polymers may be made by the process of equation 56 wherein -Ck is the crosslinked monomer.

Equation 56:

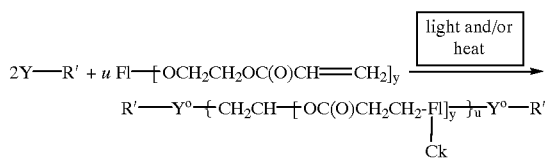

wherein x=0 and y is in the range 2<=y<=12.

Similarly, utilizing the monomer made in equation 54, crosslinked polymers can be made as in the process of equation 57, wherein Cki is the initiator or monomer derived crosslink.

Equation 57:

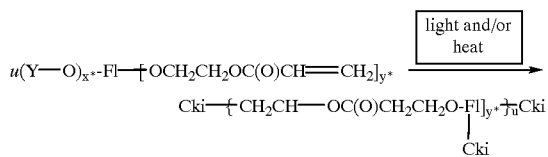

wherein x*=1 and y* is in the range 1<=y*<=12.

To achieve optimal vectoral orientation of the 3H-fluoren-3-ylidene functions within the matrix of the material the polymerizations of equations 55 through 57 are conducted in a poling electric field of magnitude 0.1 MV/cm to 3.0 MV/cm applied along the desired device or systems vector.

Similarly, utilizing the 3H-fluoren-3-ylidene functionalized IAPM, synthesized by the process of equation 21, in the copolymerization process of equation 51, which may be conducted with or without poling, novel 3H-fluoren-3-ylidene functionalized EO materials may be made. Also, copolymerization of the 3H-fluoren-3-ylidene HDM, synthesized by the process of equations 15, 17, and 19, in the process of equation 52, which may be effected with or without poling, will result in novel EO materials. Furthermore, copolymerization of the 3H-fluoren-3-ylidene NRM, synthesized by the processes of equations 18, 19, 20, 22, 23, and 24, in the process of equation 52, which may be done with or without poling, we produce novel EO materials.

As is well known to those skilled in the art selective orientation of specific sites within polymeric materials may be effected by other means, such as, compression or stretching which may be effected over a broad range of temperatures or in concert with the application of electric or electromagnetic fields. Also, increased orientation is well known to occur on the simultaneous application of electric fields and electromagnetic radiation. Therefore, a very broad range of orientations of the electrooptically and optically active 3H-fluoren-3-ylidene is subject to this excitation may be induced in the end-product materials, devices and/or systems. While for may applications specific orientations are preferred for certain applications completely random orientations of the subject active sites, such as, the electroabsorption modulator of Franz-Kehlysh Modulator discussed in section 66. For the latter application subject polymers synthesized in absence of applied fields and forces, may be applied.

The Preferred Embodiment of the Invention:
Detailed Description of Devices and Systems and Fabrication Processes for Same Conocordant with the specific examples of 3H-fluoren-3-ylidene based materials described in detail above, processes for the fabrication of devices and systems for the applications given are outlined below. Processes for the glucose sensor for animal and human skin are well known to those skilled in the art and are essentially those described in a book on this topic published in 1994 by Plenum Press of New York and London entitled: "Topics in Fluorescence Spectroscopy, Volume 4, Probe Design and Chemical Sensing". Processes for electrooptical (EO) devices, OIC's and systems are those published in the journal: Applied Physics Letter of volume 55, pages 1161 to 1163 in the year 1989 entitled: "Fabrication of Integrated Optical Structures in Polydiacetylene Fiber by Irreversible Photoinduced Bleaching"; in the book published in 1991 by Springer-Verlang of Berline, Heiddberg, New York, London, Paris, Tokyo, Hong Kong, Barcelona, and Budapest entitled: "Integrated Optics: Theory and Technology"; by Marcel Dekker, Inc. of New York, Basel, and Hong Kong entitled: "Photonic Devices and Systems".

Sensor Devices and Systems: Detailed Description of Fabrication

To demonstrate the utility as environmental sensors of the novel 3H-fluoren-3-ylidene based materials within the preferred embodiment of this invention, without the intent of limiting the scope, a specific class of sensors designed to detect and determine the levels of glucose in human and animal blood and skin is described in detail.

As described above subject 3H-fluoren-3-ylidene compounds are readily incorporated into a broad range of organic polymeric materials such as linear polymeric adhesives and crosslinked polymeric solids. Also, by utilizing technology well known to those skilled in the art, the 3H-fluoren-3-ylidene sites in these materials may be appropriately functionalized to promote optimum sensitivity of their optimal properties to the levels of glucose within their local environment. Preferred among these optical properties are the decay of polarization and lifetime of the luminescence of these sites. Simple, low cost optical telemetry is readily available for the accurate determination of these properties with semi-conductors based on optical emitters such as light emitting diodes (LED's) and laser diodes (LD's) and detectors such as photodiodes (PD). Most of these optoelectronic components function well within the blood-skin optical window from 650 nm to 1300 nm, wherein the preferred 3H-fluoren-3-ylidene based sensors can be best utilized.

For dermal glucose determination and monitoring, an adhesive linear polymer such as that produced in equation 43 could be placed on the surface of the skin and, after a momentary period for equilibration with tissue fluids, the luminescence lifetime and/or polarization decay of the material measured accurately by optoelectronic excitation and emission systems well known to those skilled in the art. This novel sensor adhesive could be applied in a thin layer on the skin or applied to an optical component which is in turn pressed against the skin. Such a component could be a small patch consisting of a strong adhesive on the edges, the sensor adhesive in the center and a backing of an optically transparent polymer sheet.

The sensor adhesive on the skin surface is then irradiated through the backing sheet with a continuous or appropriately pulsed beam of radiation from a LED or LD emitting in the 650 µm to 1200 µm wavelength range. Simultaneously, the emission from the adhesive is reflected into a sensor PD capable of measuring the characteristic luminescence in the range 700 nm to 1400 nm. The signal for the PD is sent to an appropriate microprocessor which accurately determines the lifetime and/or polarization decay of the luminescence. Since such LED's, LD's, PD's, microprocessors, and their necessary power supplies are highly miniturizable solid state systems, such a luminescence telemetry module can be as small as a transistor radio or hand calculator (ex.: ½" thick×2" wide×3" long). This module could be equipped with a direct glucose level readout display and/or a cord to an information system, such as a computer, for continuous monitoring and permanent storage of data.

For sub-dermal applications, the 3H-fluoren-3-ylidene sensor material could be a small circle or oval of a planar crosslinked polymer sheet, such as that made in equation 48, of thickness of a few microns (ex.: 10 to 100 m thick). This crosslinked polymer, as described in detail previously, could be designed for low biodegradability in biological environments for long-term implantation or high biodegradability for limited-term use. This sheet is carefully implanted singularly by a competent technologist just beneath (ex.: less than 1 nm) the surface of the skin. By employing the solid state telemetry system described above glucose levels could be intermittently or continuously monitored, such as that made in equation 48.

While the above systems directly measure glucose levels in the immediate dermal environment, they also measure glucose in proximal blood vessels since the equilibrium time between the dermal regions and local blood is the order of 30 minutes. With this correction factor in mind, blood glucose would also be intermittently or continuously monitored.

For diabetes, for example, either of these monitoring systems would greatly increase the quality of life by eliminating the need for invasive procedures requiring removal of blood which is distasteful, painful, and presents the risk of infection.

Similar 3H-fluoren-3-ylidene based materials could be produced for detection or determination of a broad range of other important parameters of concern including electrolytes, heavy metals, antibodies, fluid and blood gases, acidity and/or alkalinity, and the like.

Electroptical Devices and Systems: Detailed Description of Fabrication

Within electrooptical devices and systems the above materials may function in a broad range of applications. By virtue of the luminescence of the subject 3H-fluoren-3-ylidene sites, the derived materials may function as the source of optical radiation through direct optical pumping (fluorescence or phosphorescence) or the process of electroluminescence by which electrical current passing through the material promotes the emission of light, wherein the latter derived devices are called: light emitting diodes (LED's) and laser diodes (LD's). By virtue of the high electrical polarity, polarizability, and light absorption of the subject 3H-fluoren-3-ylidene sites, the derived materials may function as a detector of optical radiation through the process of photoconductivity by which light absorbed by the materials promotes the passage of electric current through increased conductivity, wherein derived devices are called: photodiodes (PD's). By virtue of the high electrical polarizability, including higher first order hyperpolarizability and high refractivity of the subject 3H-fluoren-3-ylidene sites, the derived materials may convey optical radiation, thereby functioning as an optical waveguide and switch or modulator. This then allows for the possibility of a broad range of devices which include: optical integrated circuits (OIC's), electrooptical modulators (EO modulators), and electrooptical switches (EO switches). By virtue of the high electrical polarizability and particularly second order hyperpolarizability of the subject 3H-fluoren-3-ylidene sites, the derived materials may function as optical switches and optical modulators, wherein one source of optical radiation passing through the material is capable of regulating a second source.

In a manner highly conducive to the above applications the 3H-fluoren-3-ylidene based materials of this invention are readily amenable to photoprocessing technology well known to those skilled in the art for the fabrication of such devices, OIC's, and systems. Specifically these novel materials undergo a permanent decrease in refraction on exposure to certain predetermined bands of electromagnetic radiation. This process may be called "photobleaching" since a decrease in the absorption in the visible and near infrared region of the absorption spectrum of the material also occurs. This photobleaching or photoprocessing steps irreversible destroys the electroactivity of the 3H-fluoren-3-ylidene sites thereby permitting isolation of electroactive, unexposed sites within the matrix of the material as is the primary objective of similar photolithographic processing practiced in other materials by those skilled in the art.

In order to demonstrate the utility of the preferred classes of 3H-fluoren-3-ylidene materials above a simple photoprocessed device will be described in detail. The essential component of this device consists of a rectangular parallelpiped of polymeric material which is 4 mm wide, 12 mm long, and 12µ thick. This component has three sets of parallel planar faces: the small faces are two parallel rectangles each measuring 4 mm by 12µ and separated by 12 mm; the medium faces are two parallel rectangles each measuring 12 mm by 12µ and separated by 4 mm; and the large faces which are two parallel rectangles each measuring 4 mm by 12 mm and separated by 12µ. The secondary components of this device are two separate lengths of optical fiber whose perpendicularly cut and polished ends are glued to the centers of the small faces of the material. These optical fibers are designed, in a non-limiting example, to convey near infrared radiation of 1.3µ wavelength and have core diameters of 7µ which core centers are carefully centered relative to the center of the small faces of the material. The "glue" used to attach these fibers to the material is transparent to 1.3µ radiation and of refractive index between that of the optical fiber core and the center of the small face of the material.

D-1

The polymeric parallelpiped component of the above device is fabricated as follows:

1.) A circle of polymeric film 2µ thick and 30 mm in diameter is held rigidly on an electrically conductive optically flat surface 1 mm thick. This film, which is called the "lower cladding layer", is an insoluble, crosslinked polymer of refractive index 0.0010 to 0.0100 refraction units, at 1.3µ, less than the next layer to be lain over it.

2.) Over the lower cladding layer is uniformly deposited an 8µ thick layer of any of the 3H-fluoren-3-ylidene monomers or appropriate comonomers described above. This layer is polymerized by the processes described above in the presence or absence of a poling field applied through the supporting surface and an overlying electrode. The resulting 3H-fluoren-3-ylidene polymer film is called the "core layer". The refractive index of the core layer is 0.0010 to 0.0100 refraction units, at 1.3µ above the lower cladding layer and the next layer to be lain over it.

3.) Over the core layer is attached or deposited a polymeric film of a uniform 2µ thickness. This film has a refractive index 0.0010 to 0.0100 refraction units, at 1.3µ, less than the core layer.

4.) The resulting circles of a 12µ thick polymeric layer overcoated on an optically flat surface 1 mm thick, of overall thickness 1.012 mm thick, is cut into rectangular parallelpipeds 4 mm wide, 12 mm long, and 1.012 mm thick. The small faces of this form measuring 4 mm long and 1.012 mm wide are carefully optically polished.

5.) The 12µ thick polymeric film may be removed to produce the free polymeric parallelpiped component, shown as "a" in diagram D-1 above, or left in place on the conductive support for further processing.

The polymeric paralledpiped component fabricated above is now photoprocessed as follows:

1.) A photoprocessing mask is prepared by deposition of an optically opaque line 20 mm long and 8µ wide on an optically transparent, optically flat glass plate measuring 10 mm wide, 20 mm long and 1 mm thick wherein the 10 mm by 20 mm face is the large face; the 10 mm edge is the short edge; and the 20 mm edge is the long edge. The opaque line is deposited on the large face; parallel to the long edge and directed between the centers of the parallel short edges. The center of this line is the geometric center of the large face.

2.) The above mask is placed over the polymeric parallelpiped component so that the planes of the large faces are parallel and separated by 1µ. The geometric centers of these planes lie directly over each other and the respective long edges, and the respective short edges are positioned parallel to each other. In this orientation the opaque line of the mask appears from above to span a track between the centers of the short edges of the polymeric component below.

3.) Perpendicular to and above the mask a beam of collimated electromagnetic radiation is projected through the mask and the polymeric component beneath. The wavelength of this radiation is that known to cause an irreversible change in the refraction and/or optical absorption of the core layer of this component. The upper and lower cladding layers are optically transparent or become optically transparent to some degree during this irradiation process. Irradiation is continued until the desired change in refraction of the component occurs.

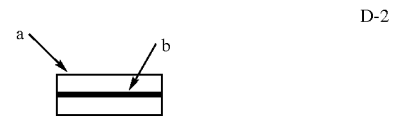

D-2

The photoprocessed polymeric parallelpiped component fabricated above consists of three layers of materials wherein the center or core layer is optically bleached in a manner in which only a long and thin internal rectangular parallelpiped structure is left unbleached. This internal structure appears to the unaided eye as a thin line 12 mm long and parallel to the 12 mm long edge of the overall material and connecting the centers of the two, parallel 4 mm short edges of the material as shown in diagram D-2 above wherein "a" is the bleached polymer and "b" is the unbleached waveguide. When the small 4 mm by 12µ face of the material is observed under the microscope there is seen a small square of unbleached core layer measuring 8µ by 8µ with its geometric center the center of the face and its edges closely parallel to the edges of the face. Collimated light perpendicular to this face projected into this small square of wavelength 1.3 u, a wavelength not absorbed by the material, is carried along the long axis of the component with very little loss and emitted from the cube on the opposite edge of the material. This unbleached track is an efficient optical waveguide for 1.3µ radiation.

The above component is a simple and elementary optical device, OIC, or system. It is an electrooptically passive device which is capable of efficiently containing and conveying optical signals of 1.3µ wavelength. Therefore coherent 1.3µ light introduced into the square cross section of the waveguide and perpendicular to the small face is carried efficiently with very little loss along the length of the waveguide which is geometrically a rectangular parallelpiped of 12 mm length, 8µ width, and 8µ thickness. The corresponding poled waveguide will efficiently convey polarized 1.31µ coherent radiation as is emitted by many commercial LD sources if the electric vector of the radiation is perpendicular to the large plane of the component and rigidly maintain the direction of polarization throughout the waveguide.

The above component can be made into a fiber optic device by first cutting two separate lengths of single mode optical fiber, capable of conveying, with polarization preservation, radiation of 1.3$\mu$ wavelengths, so that the faces are neatly perpendicular to the long axis of the fiber and will optically polished. The waveguiding core of this fiber is a circle 8$\mu$ in diameter. The polished faces of these respective fibers are carefully glued to the small 4 mn×12$\mu$ faces of the component in such a manner that the core of the fibers are centered within the 8$\mu$×8$\mu$ square of the entrance and exists of the photoprocesses waveguide which is centered in this face. The glue layer is 1$\mu$ or less thick and is transparent to 1.3$\mu$ radiation and of refractive index in between the index of the fiber core and component waveguide. A diagram of this fibered component is shown as diagram D-3 below wherein "a" is the bleached polymer, "b" is the optical waveguide, "c" is the fiber optic glue and "d" is the single mode optical fiber.

D-3

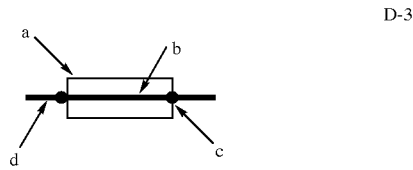

The 3H-fluoren-3-ylidene sites within the above component are luminescent and excitation of these sites with light in the long wavelength absorption band will cause the waveguide to emit radiation at longer wavelengths and therefore act as an optical signal source. With techniques well known to those skilled in the art, laser optics are affixed to the optical fibers the above system and may essentially function as a dye laser and therefore as a coherent optical signal device. Such incoherent and coherent signal production could also be effected through the process of electroluminescence by placing conductive electrodes above and below the large faces of the component and passage of the appropriate current at the necessary voltage. The coherent device thus behaves like a LD and the incoherent device like a LED. Therefore, optical transmitter devices and OIC and systems components can be fabricated from the subject 3H-fluoren-3-ylidene materials of this invention. Such materials formulated within conductive polymeric matrices will exhibit photoconduction, and in the above electroded device, perform like PD detectors, wherein the conductivity is a measure of the intensity of the absorbed radiation. For this specific application wider waveguides may be preferred.

The above component may be employed to modulate radiation of wavelengths slightly greater than the cutoff wavelength of visible or near infrared absorption of the waveguide. Such modulation can be effected in the above electroded design by the electroabsorption or Franz-Keldysh Effect. Therefore, by applying voltages of the magnitude of the above poling voltages to the electrodes, the long wavelength absorption of the waveguide will shift to longer wavelengths. Concordently, if radiation of slightly longer wavelengths than the end of the long wavelength absorption of the waveguide is conducted through the waveguide, light will be absorbed when the field is switched on due to the electrochromism of the 3H-fluoren-3-ylidene sites within the waveguide. Since the latter effect is induced by the strong electric field produced within the waveguide by the higher voltage applied to the electrodes and not by current passage, the surfaces of the electrodes facing the polymer is coated, for this application and the one described below, with a thin layer, between 0.1 and 1.0$\mu$ thick, of an insulator. If for example, the electrodes are silicon a coating of silicon dioxide introduced by oxidation is applied as this insulator. These insulator layers are called: "buffer layers".

The above component with buffered electrodes and strongly poled core layer can function as an EHF organic EO modulator, specifically: a polarization rotation modulator. For this application, the electroactive waveguide will function as a switch or modulator for 1.3$\mu$ radiation by virtue of the high first order hyperpolarizability, $\beta$, of the 3H-fluoren-3-ylidene sites in the material and the resultant high $\chi_2$ of the poled material. In this application highly polarized light from a 1.3$\mu$ LD is introduced into the end of the waveguide with the electric vector of the admitted radiation oriented along the diagonal of the entrance cube of the waveguide. On application of voltage to the buffered electrodes the waveguide becomes birefringent and the polarization of the signal rotates in an angle relative to the perpendicular large face passing through the center of the cube. By placement of a polarization discriminating filter on the radiation outlet side of the component oriented so that only the original, no-field polarized radiation is passed through the filter, this polarized radiation will be switched off upon application of an appropriate voltage which results in rotation of the polarization. This is a 3H-fluoren-3-ylidene based polarization rotation modulator which can be operated at EHF frequencies. In addition, a broad range of other more complex waveguide designs, well known to those skilled in the art, such as the Mach-Zehnder design may be used effectively to induce EHF modulation.

What is claimed is:

1. A 3H-fluoren-3-ylidene compound having structure 1:

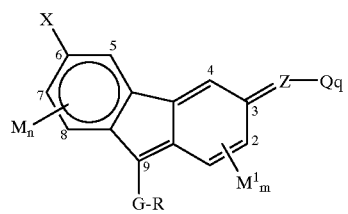

1 where said structure may be represented as such or as electrically bipolar materially equivalent canonical structures 1D and 1A;

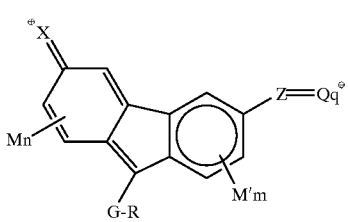

1D

-continued

1A
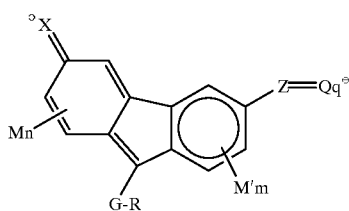

X- may be either D- or A-;

D- may be an electron-donating group J;

D- comprises $D^1=Z-$ in structures 1D-a, 2A-a, or 2D-a, corresponding to $0D^1-Z=$ in resonance canonical structures 1D-b, 2A-b, 2D-b, or $D^2=C-$ in structures 1D-a, 2A-a, or 2D-a, corresponding to $0D^2-C=$ in resonance canonical structures 1D-b, 2A-b, or 2D-b;

1A-a
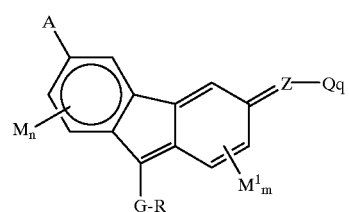

1A-b
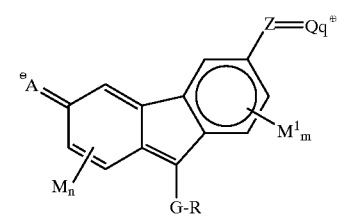

1D-a
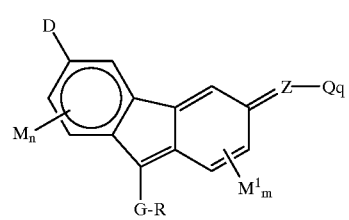

1D-b
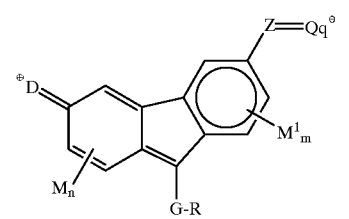

-continued 2A-a
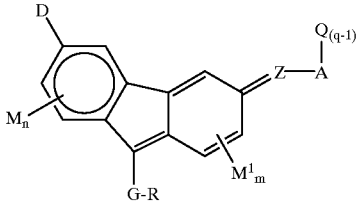

2A-b
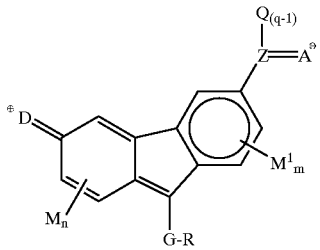

2D-a
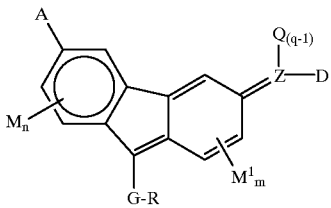

2D-b
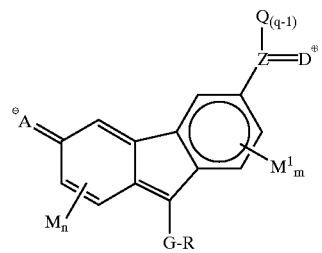

where $D^1$ and $D^2$ are substituted or unsubstituted unsaturated heterocyclic organic ring systems having one to (a−1) members being at least one electron donating heteroatom having one or two lone electron pairs being bonded to a carbon or to a heteroatom of the ring system and being J or L;

Z is N, P, As, Sb, Bi or C, Si, Ge being substituted or unsubstituted, the substituents being J, L, $R^1$, $R^2$, G-R, Q, T, Y, or $R^*$;

$Z^1$ and $Z^2$ each independently have the same definition as Z;

$D^2=C-$ in structures 1D-a, 2A-a, or 2D-a, corresponding to $0D^2-C=$ in resonance canonical structures 1D-b, 2A-b, or 2D-b, is a substituted or unsubstituted aromatic carbocyclic or substituted aromatic heterocyclic ring system, where C of $D^2=C-$ or $0D^2-C=$ is a member of the ring system having b members and c J substituents, where c is zero to (b−1) and each J substituent is the same or different, $D^2=C-$ or $0D^2-C=$ further having from zero to (b−c) additional substituents, the additional substituents being $R^1$, $R^2$, $G-R^3$, G-Q, G-T, G-Y, $G-R^*$, Q, T, Y, or $R^*$;

A- is an electron withdrawing L group;

where

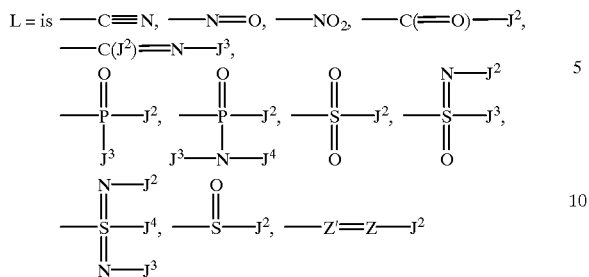

$L^1$ independently has the same definition as L;
where J is an electron-donating group —R, $R^1$, $R^2$, $R^3$, $(CH_2)_n$—$R^1$, —S—$R^1$, —O—$R^1$, —N($R^1$)($R^2$), -G-$R^1$, —$(CH_2)_n$-G-$R^1$, —S-G-$R^1$, —O-G-$R^1$, —N(-G-$R^1$)(-G-$R^2$), —O—O—$R^1$, —O—O-G-$R^1$,—S—S—$R^1$,—S—S-G-$R^1$; $J^1$ is —$(CH_2)_n$—$R^1$, —S—$R^1$,—O—$R^1$ or —N($R^1$)($R^2$); $J^2$, $J^3$, and $J^4$ each independently have the same definition

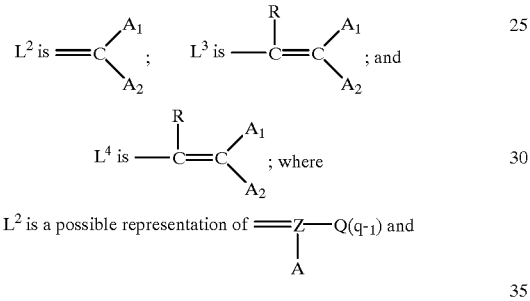

where $A^1$ and $A^2$ are independently each an electron-withdrawing L group or $A^1$ and $A^2$ together may form a substituted or unsubstituted ring system when the L group contains a R substituent, where R and the substituents for the $A^1$-$A^2$ ring system are independently J, L, $R^1$, $R^2$, G-R, Q, T, Y, or R*;

G is a diradical comprising substituted or unsubstituted —(CH=CH)$_n$—; n is an integer from 1 to 10, substituted or unsubstituted —(CH$_2$)$_w$—; w is an integer from 1 to 22, a substituted or unsubstituted aromatic ring system of 6 to 16 carbons or a substituted or unsubstituted aromatic heterocyclic ring system of 5 to 14 members in the ring system, the members being carbon and 1 to (g−1) heteroatoms; g is the number of members in the heterocyclic ring system, the heteroatoms being one or more of N, P, O, S, Se, or Te; G substituents being $J^1$ or $L^1$ with 6 being the maximum number of substituents;

$R^1$ and $R^2$ are independently H, F, Cl, Br, I, Q, T,Y alkyl of 1 to 22 carbons, cycloalkyl of 3 to 22 carbons, a substituted or unsubstituted aromatic ring system of 6 to 16 carbons or a substituted or unsubstituted aromatic heterocyclic ring system of 5 to 14 members in the ring system, the members being carbon atoms and 1 to (h−1) heteroatoms; h is the number of members in the heterocyclic ring system, the heteroatoms being one or more of N, P, O, S, Se, or Te; $R^1$ or $R^2$ substituents being $J^1$ or $L^1$ with 7 being the maximum number of substituents;

$R^3$ is H,F,Cl, Br, I, Q, T, Y alkyl of 1 to 22 carbons or cycloalkyl of 3 to 22 carbons;

R* is a chemically reactive group being carbonyl halides of 1 to 2 carbons; sulfonyl halides of 0 to 20 carbons; sulfinyl halides of 0 to 20 carbons; phosphoryl halides of 0 to 20 carbons; imidyl halides of 1 to 21 carbons; alkyl halides of 1 to 31 carbons; α-haloesters of 1 to 31 carbons; α-haloketones of 1 to 31 carbons; aryl halides of 6 to 32 carbons; heterocyclyl halides of 1 to 22 carbons and 1 to 21 heteroatoms one or more of which may be N, P, O, S, Se, and Te; cycloalkyl halides of 2 to 32 carbons. In addition, such reactive R* groups may be reactive unsaturated groups, such as, isocyanates; isothocyanates; ketenes; olefines; acetylenes, allenes; ketones; α,β-diones; α,β,γ-triones; imines; α,β-diimines; azides; carbodimides; unsaturated ketones, esters, sulfonones, sulfonamides, and sulfonates; and carbon double bonded to heteroatoms, such as, P, S, Se, and Te; alcohols of 1 to 21 carbons; carboxylic acids of 1 to 21 carbons; sulfonic acids of 0 to 20 carbons; carboxamides of 1 to 21 carbons; sulfonamides of 0 to 20 carbons; amines of 1 to 30 carbons; aryl groups of 6 to 36 carbons; heteroaryl groups of 1 to 22 carbons and 1 to 21 heteroatoms one or more of which may be N, P, O, S, Se, or Te; mercaptans of 0 to 21 carbons; phosphates; alkali metals, such as, Li, Na, K, Rb, and Cs; alkaline earth metals, such as, Be, Mg, Ca, Sr, and Ba; transition metals; and metals of the B-group of the periodic table;

Q is a A,D, electron lone pair, or T group;

T is a polymerizable group being an a, b, unsaturated carbonyl of 4 to 26 carbons, vinyl ether of 3 to 25 carbons, carboxylic acid of 2 to 23 carbons, ester of 3 to 45 carbons, alcohol of 1 to 22 carbons, isocyanate of 1 to 22 carbons, isothiocyanate of 1 to 22 carbons, amine of 1 to 44 carbons, 1-substituted or 1,1-substituted alkylene of 2 to 44 carbons, polymerizable group of 1 to 44 carbons containing a nucleophilically replaceable group of zero to 22 carbons, where T substituents being G-Y, G-Q, and G-R*;

Y is a polymerization-initiating group being an α,β-dione of 2 to 22 carbons; an azoalkane of 1 to 21 carbons; an alkylperoxide of 1 to 21 carbons, a hydroperoxide of 0 to 20 carbons; a peroxide ester of 1 to 21 carbons; a persulfonate of 0 to 20 carbons; an α,β-disulfone of 0 to 20 carbons; an ester of 1 to 21 carbons; an ether of 1 to 21 carbons; an alcohol of 1 to 21 carbons; an amine of 1 to 41 carbons; a sulfonic acid of 0 to 20 carbons; a carboxamide of 1 to 21 carbons; an acid methyl of structure —CHA$^1$A$^2$ of 1 to 31 carbons; a substituted cyclopropane of 3 to 23 carbons; a substituted cyclobutane of 4 to 24 carbons; a substituted iodonium group of 1 to 31 carbons; a substituted sulfonium group of 2 to 42 carbons; Y Substituents on the polymerization-initiating group being J, L, $R^1$, $R^2$, G-R, G-Q, G-T, G-R*, Q, T, or R*;

M and $M^1$ are independently substituents of type J, L, $R^1$, $R^2$, Q, T, Y, G-R, G-Q, G-T, G-R*, and G-Y M substituents are n wherein n is in the range 0 to 3 and the number of M substituents is m where m is in the range 0 to 3;

M and M' are a carbocyclic or heterocyclic ring system fused to positions 7 to 8 of structure 1 wherein the carbocyclic ring system is of 6 to 46 carbons and wherein the heterocyclic ring system is of 2 to 32 carbons and which may include up to 20 heteroatoms including one or more of: N, P, O, N, S, Se, Te, or I; $M^1$ may also be independently a carbocyclic or heterocyclic ring system fused to the positions 1 to 2 of structure 1 wherein the carbocyclic ring system is of 6 to 46 carbons and wherein the heterocyclic ring system is of 2 to 32 carbons and which may include up to 20 heteroatoms including one or more of: N, P, O, N, S, Se, Te, or I;

M and/or $M^1$ are independently -G- groups which connect directly proximal substituents of structure 1 including the X substituent at position 6, 5 and 7 and/or substituents upon these positions; the Z and/or Q substituents at positions 1, 2, 3, 4, 5, 6 or 7 and/or substituents upon these positions; where -G groups may be then independently substituted with substituents of type J, L, R', $R^2$, Q, R*, T, Y, $G^1$-R, $G^1$-Q, $G^1$-T, $G^1$-Y and $G^1$-R*, where $G^1$ has the same definition as G.

2. Concatenated analogues of 1 of claim 1, such as, structure 3, 4, and 5 which contain polymeric string of 1-sites and wherein the degrees of polymerization O and P are in the range one to one million. Wherein the substituents X,M,m,G,G',R,M'm.Z,Q,Qq, and Q(q-1) are defined in claim 1;

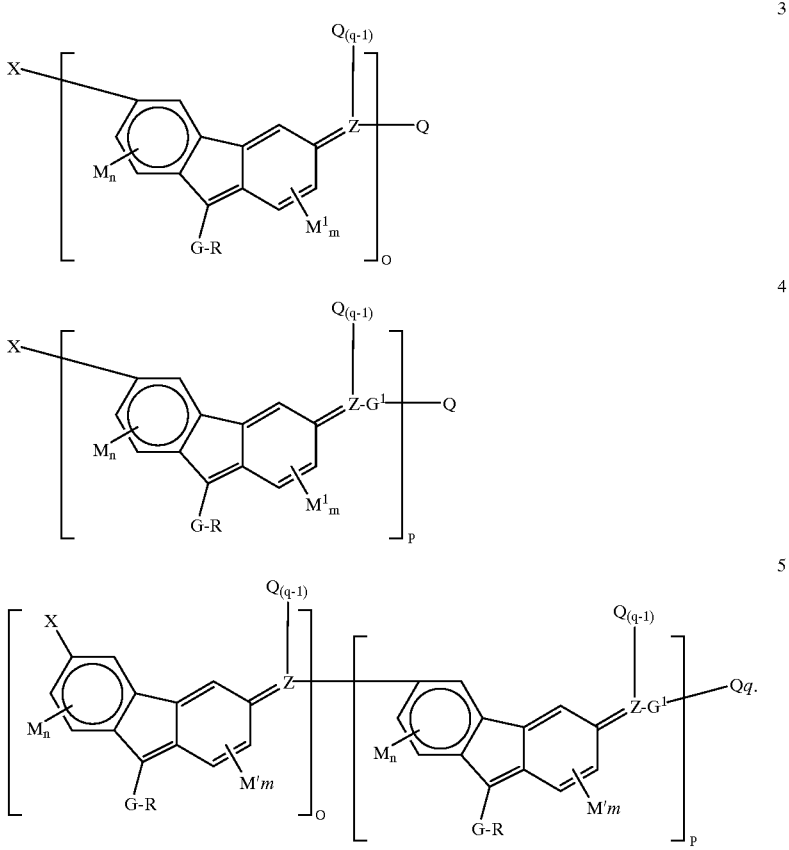

* * * * *